United States Patent
Venkatram et al.

(10) Patent No.: US 11,665,522 B2
(45) Date of Patent: May 30, 2023

(54) TECHNIQUES FOR HANDLING PUBLIC WARNING SYSTEM INFORMATION USING MULTIPLE MESSAGE BUFFERS

(71) Applicant: QUALCOMM incorporated, San Diego, CA (US)

(72) Inventors: Karthik Venkatram, San Diego, CA (US); Shanshan Wang, San Diego, CA (US); Daniel Amerga, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/384,653

(22) Filed: Jul. 23, 2021

(65) Prior Publication Data

US 2022/0030411 A1     Jan. 27, 2022

Related U.S. Application Data

(60) Provisional application No. 63/056,506, filed on Jul. 24, 2020.

(51) Int. Cl.
*H04W 4/90* (2018.01)
*H04W 36/32* (2009.01)
(Continued)

(52) U.S. Cl.
CPC ......... *H04W 4/90* (2018.02); *H04W 36/0058* (2018.08); *H04W 36/00837* (2018.08);
(Continued)

(58) Field of Classification Search
CPC ............ H04W 4/90; H04W 36/00837; H04W 36/0058; H04W 36/08; H04W 36/32; H04W 68/005
(Continued)

(56) References Cited

U.S. PATENT DOCUMENTS

| | | | |
|---|---|---|---|
| 2017/0064764 A1 | 3/2017 | Ke et al. | |
| 2020/0137669 A1 | 4/2020 | Lee et al. | |

FOREIGN PATENT DOCUMENTS

WO    WO-2020029061 A1    2/2020

OTHER PUBLICATIONS

International Search Report and Written Opinion—PCT/US2021/043090—ISA/EPO—dated Nov. 12, 2021(2105440WO).

(Continued)

*Primary Examiner* — Joel Ajayi
(74) *Attorney, Agent, or Firm* — Holland & Hart LLP

(57) ABSTRACT

Methods, systems, and devices for wireless communications are described. A user equipment (UE) may be configured to maintain multiple message buffers for storing public warning system (PWS) information. The UE may receive a first segment of public PWS information via a first cell, where the PWS information is associated with a geographical scope that includes the first cell. The UE may perform a cell change procedure from the first cell to a second cell different from the first cell, and may receive a second segment of the PWS information via the second cell. The UE may then store the first segment and the second segment within multiple message buffers based on the second cell being included within the geographical scope associated with the PWS information.

30 Claims, 19 Drawing Sheets

(51) Int. Cl.
    *H04W 36/08*    (2009.01)
    *H04W 36/00*    (2009.01)
    *H04W 68/00*    (2009.01)

(52) U.S. Cl.
    CPC ........... *H04W 36/08* (2013.01); *H04W 36/32* (2013.01); *H04W 68/005* (2013.01)

(58) Field of Classification Search
    USPC ..................................................... 455/404.1
    See application file for complete search history.

(56) References Cited

OTHER PUBLICATIONS

Qualcomm Incorporated, et al., "Corrections for PWS Notifications," 3GPP Draft, 3GPP TSG-RAN2 Meeting #103bis, 38331CR0404_R2-1814948 Corrections for PWS Notifications, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 12, 2018, Sep. 28, 2018 (Sep. 28, 2018), XP051524325, 9 pages, Retrieved from the Internet: URL: http://www.3gpp.org/ftp/tsg%5Fran/WG2%5FRL2/TSGR2%5F103bis/Docs/R2%2D1814948%2Ezip [retrieved on Sep. 28, 2018] p. 2, Section 5.2.2.2.1; p. 5, Section 5.2.2.4.9.

TECHNIQUES FOR HANDLING PUBLIC WARNING SYSTEM INFORMATION USING MULTIPLE MESSAGE BUFFERS

CROSS REFERENCE

The present Application for Patent claims the benefit of U.S. Provisional Patent Application No. 63/056,506 by VENKATRAM et al., entitled "ERROR HANDLING FOR PUBLIC WARNING SYSTEM INFORMATION," filed Jul. 24, 2020, assigned to the assignee hereof, and expressly incorporated by reference herein.

TECHNICAL FIELD

The following relates to wireless communications, including techniques for handling public warning system (PWS) information using multiple message buffers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support the communication of warning information (e.g., public warning system (PWS) information, earthquake and tsunami warning system (ETWS) information, commercial mobile alert system (CMAS) information) to alert users to events such as natural disasters, public safety alerts, evacuation alerts, and other information. In some cases, a presence of PWS information may be indicated to UEs by the network (e.g., by a base station) and, based on receiving such an indication, a UE may attempt to receive or decode the PWS information using a configured communication resource.

SUMMARY

The described techniques relate to improved methods, systems, devices, and apparatuses that support techniques for handling public warning system (PWS) information using multiple message buffers. Generally, the described techniques enable a user equipment (UE) to maintain multiple "message buffers" for storing received PWS segments. The use of multiple message buffers may improve the reception and storage of PWS segments as the UE moves from cell to cell. In particular, if a UE determines that a new Cell B is included within the same geographical scope associated with PWS information received on a previous Cell A (e.g., PWS information received via Cell A applies to Cell B), the UE may maintain multiple message buffers for the respective cells rather than discarding PWS segments received via the previous Cell A, which may reduce how much time it takes for the UE to receive and decode the full PWS information. Conversely, if the new Cell B is not included within the geographical scope of the PWS information, the UE may discard PWS segments received via Cell A, as the PWS information received on Cell A does not apply to the new Cell B.

A method for wireless communication at a user equipment (UE) is described. The method may include receiving a first segment of public warning system (PWS) information via a first cell, where the PWS information is associated with a geographical scope that includes the first cell, performing a cell change procedure from the first cell to a second cell different from the first cell, receiving a second segment of the PWS information via the second cell, and storing the first segment and the second segment within multiple message buffers based on the second cell being included within the geographical scope associated with the PWS information.

An apparatus for wireless communication at a UE is described. The apparatus may include a processor, memory coupled with the processor, and instructions stored in the memory. The instructions may be executable by the processor to cause the apparatus to receive a first segment of PWS information via a first cell, where the PWS information is associated with a geographical scope that includes the first cell, perform a cell change procedure from the first cell to a second cell different from the first cell, receive a second segment of the PWS information via the second cell, and store the first segment and the second segment within multiple message buffers based on the second cell being included within the geographical scope associated with the PWS information.

Another apparatus for wireless communication at a UE is described. The apparatus may include means for receiving a first segment of PWS information via a first cell, where the PWS information is associated with a geographical scope that includes the first cell, means for performing a cell change procedure from the first cell to a second cell different from the first cell, means for receiving a second segment of the PWS information via the second cell, and means for storing the first segment and the second segment within multiple message buffers based on the second cell being included within the geographical scope associated with the PWS information.

A non-transitory computer-readable medium storing code for wireless communication at a UE is described. The code may include instructions executable by a processor to receive a first segment of PWS information via a first cell, where the PWS information is associated with a geographical scope that includes the first cell, perform a cell change procedure from the first cell to a second cell different from the first cell, receive a second segment of the PWS information via the second cell, and store the first segment and the second segment within multiple message buffers based on the second cell being included within the geographical scope associated with the PWS information.

In some examples of the method, apparatuses, and non-transitory computer-readable medium described herein, storing the first segment and the second segment may include operations, features, means, or instructions for storing the first segment in a first message buffer associated with the first cell and the second cell based on the second cell being included within the geographical scope associated with the PWS information and storing the second segment in the first message buffer and a second message buffer associated with the second cell based on the second cell being included within the geographical scope associated with the PWS information, the second message buffer different from the first message buffer.

Some examples of the method, apparatuses, and non-transitory computer-readable medium described herein may further include operations, features, means, or instructions for receiving a third segment of the PWS information via the second cell and storing the third segment in the first message buffer and the second message buffer.

Some examples of the method, apparatuses, and non-transitory computer-readable medium described herein may further include operations, features, means, or instructions for receiving a serial identifier associated with the second segment and identifying that the second cell may be included within the geographical scope associated with the PWS information may be based on the serial identifier associated with the second segment.

Some examples of the method, apparatuses, and non-transitory computer-readable medium described herein may further include operations, features, means, or instructions for storing the first segment in the first message buffer, storing the second segment in the second message buffer, or both, based on a first serial identifier associated with the first segment matching a second serial identifier associated with the second segment and a first message identifier associated with the first segment matching a second message identifier associated with the second segment.

Some examples of the method, apparatuses, and non-transitory computer-readable medium described herein may further include operations, features, means, or instructions for discarding the first message buffer based on a first segmentation configuration associated with at least one segment stored in the first message buffer being different from a second segmentation configuration associated with at least one additional segment stored in the second message buffer.

Some examples of the method, apparatuses, and non-transitory computer-readable medium described herein may further include operations, features, means, or instructions for discarding the first message buffer based on the first segment and the second segment corresponding to a same PWS segment of the PWS information and a first length of the first segment being different from a second length of the second segment.

Some examples of the method, apparatuses, and non-transitory computer-readable medium described herein may further include operations, features, means, or instructions for discarding the first message buffer based on a sequentially last segment stored in the first message buffer being different from a sequentially last segment stored in the second message buffer.

Some examples of the method, apparatuses, and non-transitory computer-readable medium described herein may further include operations, features, means, or instructions for discarding the first message buffer based on a first concatenation configuration associated with the first message buffer being different from a second concatenation configuration associated with the second message buffer.

Some examples of the method, apparatuses, and non-transitory computer-readable medium described herein may further include operations, features, means, or instructions for discarding the first message buffer based on a first message identifier or a first serial identifier associated with the first segment being different from a second message identifier or a second serial identifier, respectively, associated at least one segment stored in the second message buffer.

Some examples of the method, apparatuses, and non-transitory computer-readable medium described herein may further include operations, features, means, or instructions for discarding the first message buffer based on an expiration of a timer associated with the first segment, the PWS information, or both.

Some examples of the method, apparatuses, and non-transitory computer-readable medium described herein may further include operations, features, means, or instructions for decoding the PWS information based on the first message buffer being completed, the second message buffer being completed, or both.

Some examples of the method, apparatuses, and non-transitory computer-readable medium described herein may further include operations, features, means, or instructions for performing, sequentially, one or more additional cell change procedures to additional target cells, with a first additional cell change procedure being from the second cell to a first additional target cell, the additional target cells included within the geographical scope associated with the PWS information, receiving, in connection with each additional cell change procedure and via respective additional target cells, respective additional segments of the PWS information, storing each of the respective additional segments in respective first additional message buffers that may be each associated with one of the additional target cells corresponding to the respective additional segments, and storing each of the respective additional segments in second additional message buffers that may be each associated with the one of the additional target cells and that may be each also associated with the first cell, the second cell, and respective sets of the additional target cells to which the UE was changed over prior to being changed over to the one of the additional target cells.

Some examples of the method, apparatuses, and non-transitory computer-readable medium described herein may further include operations, features, means, or instructions for storing each of the respective additional segments in third additional message buffers that may be each associated with a different set of two or more target cells to which the UE was changed over prior to being changed over to the one of the additional target cells and discarding one or more message buffers based on a quantity of message buffers at the UE satisfying a depth threshold.

Some examples of the method, apparatuses, and non-transitory computer-readable medium described herein may further include operations, features, means, or instructions for discarding one or more message buffers includes discarding an oldest message buffer at the UE, a second-oldest message buffer at the UE, or both.

Some examples of the method, apparatuses, and non-transitory computer-readable medium described herein may further include operations, features, means, or instructions for performing, sequentially, one or more additional cell change procedures to additional target cells, with a first additional cell change procedure being from the second cell to a first additional target cell, the additional target cells included within the geographical scope associated with the PWS information, receiving, in connection with each additional cell change procedure and via respective additional target cells, respective additional segments of the PWS information, storing each of the respective additional segments in respective first additional message buffers that may be each associated with one of the additional target cells corresponding to the respective additional segments, and storing each of the respective additional segments in second additional message buffers that may be each associated with the one of the additional target cells and that may be each also associated with a sequentially preceding target cell to which the UE was changed over to prior to being changed over to the one of the additional target cells.

Some examples of the method, apparatuses, and non-transitory computer-readable medium described herein may further include operations, features, means, or instructions for discarding a sequentially preceding second additional message buffer associated with target cells to which the UE was handed over prior to being changed over to the one of the additional target cells.

Some examples of the method, apparatuses, and non-transitory computer-readable medium described herein may further include operations, features, means, or instructions for receiving, via the second cell and based on performing the cell change procedure, a system information block including PWS scheduling information associated with the second cell, where the second segment of the PWS information may be received in accordance with the PWS scheduling information.

In some examples of the method, apparatuses, and non-transitory computer-readable medium described herein, the geographical scope includes a set of one or more cells, a public land mobile network, a tracking area, or any combination thereof.

Some examples of the method, apparatuses, and non-transitory computer-readable medium described herein may further include operations, features, means, or instructions for biasing a cell measurement associated with the first cell or a cell measurement associated with the second cell and transmitting, to a base station, the biased cell measurement associated with the first cell or the biased cell measurement associated with the second cell, where performing the cell change procedure may be based on transmitting the biased cell measurement associated with the first cell or the biased cell measurement associated with the second cell.

In some examples of the method, apparatuses, and non-transitory computer-readable medium described herein, the PWS information may be associated with the geographical scope that includes the first cell and the second cell, and the UE biases the cell measurement associated with the first cell or the cell measurement associated with the second cell based on the second cell being associated with the geographical scope of the PWS information.

In some examples of the method, apparatuses, and non-transitory computer-readable medium described herein, performing the cell change procedure may include operations, features, means, or instructions for initiating a reselection to the second cell based on the second cell being associated with the geographical scope of the PWS information.

Some examples of the method, apparatuses, and non-transitory computer-readable medium described herein may further include operations, features, means, or instructions for receiving a paging signal including an indication of the presence of the PWS information, where receiving the first segment may be based on receiving the paging signal.

Some examples of the method, apparatuses, and non-transitory computer-readable medium described herein may further include operations, features, means, or instructions for receiving a system information block including an indication of the presence of the PWS information, where receiving the first segment may be based on receiving the system information block.

DETAILED DESCRIPTION

Figure 1:
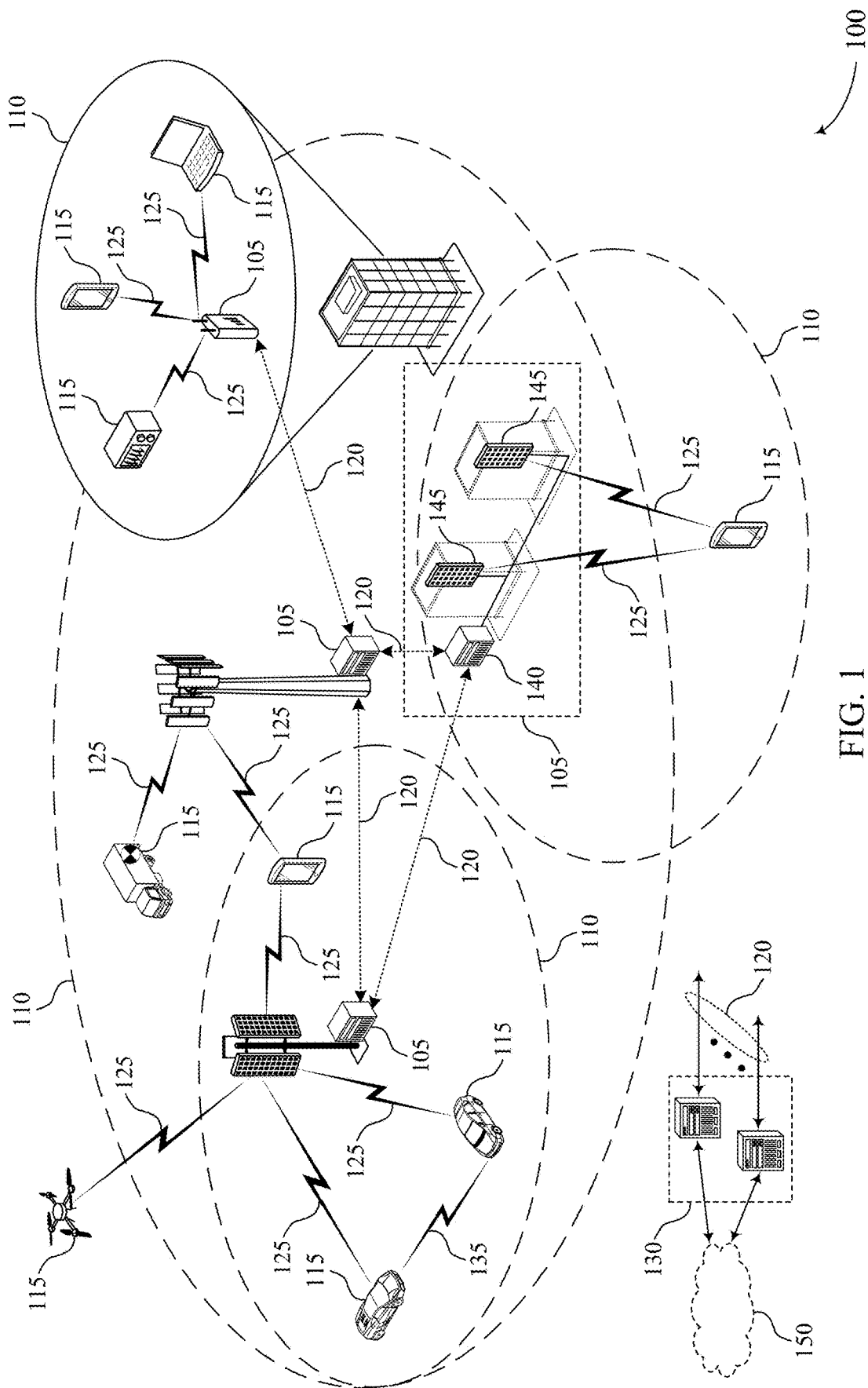
FIG. 1 illustrates an example of a wireless communications system that supports techniques for handling public warning system (PWS) information using multiple message buffers in accordance with aspects of the present disclosure.

The described techniques relate to improved methods, systems, devices, and apparatuses that support error handling for public warning system (PWS) information. Generally, the described techniques provide for a user equipment (UE) to identify a presence of PWS information, which may include processing an indication from a paging signal, an indication from system information (SI) such as a system information block (SIB), or another indication from a network (e.g., from or via a base station). Based on such an indication, the UE may evaluate whether the PWS information can be successfully received (e.g., decoded, processed, assembled) using a first communication resource, such as a first bandwidth part (BWP) of a radio frequency spectrum, a first communication link (e.g., a first radio link, via a first cell, via a first network node), or another communication resource configuration. If the UE determines that it is unable to receive the PWS information using the first communication resource (e.g., upon an expiration of a timer or counter), the UE may initiate a transition to a second communication resource, such as a second (e.g., different) BWP or communication link to monitor for the indicated PWS information. In some examples, such a transition may be initiated based on such techniques as the UE indicating a radio link failure (RLF), biasing cell measurements of or from the UE to prompt a cell reselection by the network, releasing a communication link with a cell associated with the first communication resource, or performing a UE-initiated reselection to a new cell associated with the second communication resource. By initiating such a transition, a UE may be able to receive the PWS information more quickly or more efficiently than if the UE attempted to receive the PWS information using the first communication resource, among other benefits.

Additional aspects of the present disclosure are directed to techniques which enable a UE to maintain multiple "message buffers" for storing received PWS segments. The use of multiple message buffers may improve the reception and storage of PWS segments as the UE moves from cell to cell. For example, if a UE determines that a new Cell B is included within the same geographical scope associated with PWS information received on a previous Cell A (e.g., PWS information received via Cell A applies to Cell B), the UE may maintain multiple message buffers for the respective cells rather than discarding PWS segments received via the previous Cell A, which may reduce how much time it takes for the UE to receive and decode the full PWS information. Conversely, if the new Cell B is not included within the geographical scope of the PWS information, the UE may discard PWS segments received via Cell A, as the PWS information received on Cell A does not apply to the new Cell B.

Aspects of the disclosure are initially described in the context of wireless communications systems and related signaling and operations. Aspects of the disclosure are further illustrated by and described with reference to apparatus diagrams, system diagrams, and flowcharts that relate to error handling for PWS information.

FIG. 1 illustrates an example of a wireless communications system 100 that supports techniques for handling PWS information using multiple message buffers in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support the communication of warning information (e.g., PWS information) to alert users to events such as natural disasters, safety alerts, evacuation alerts, and other information. In some cases, a presence of PWS information may be indicated to one or more UEs 115 by the network (e.g., by the core network 130, via a base station 105) and, based on such an indication, the UEs 115 may attempt to receive or decode the PWS information using a configured communication resource. However, a UE 115 may be unable to receive or decode PWS information for various reasons, including poor or degrading connectivity, an inability to read a SIB or other system information (OSI), a network misconfiguration, invalid content, or improper assembly of PWS segments, among other reasons. If a UE 115 is unable to successfully receive or decode the PWS information, the UE 115 may continue attempts to receive or decode the PWS information using the same configured resource. However, in some examples, continuing to attempt to receive or decode PWS information using the same configured resource may be associated with adverse power consumption or a delayed reception or decoding of the PWS information.

In accordance with examples as disclosed herein, a UE 115 may identify a presence of PWS information (e.g., based on a paging signal, based on a SIB) and evaluate whether the PWS information can be successfully received (e.g., decoded, processed, assembled) using a first communication resource, such as a first BWP of a radio frequency spectrum, a first communication link (e.g., a first radio link, via a first cell, via a first network node), or other communication resource configuration. If the UE 115 determines that it is unable to receive the PWS information using the first communication resource (e.g., upon an expiration of a timer or counter), the UE 115 may initiate a transition to a second communication resource, such as a second (e.g., different) BWP or communication link, to monitor for the indicated PWS information. In some examples, initiating such a transition may include the UE 115 indicating a RLF to the network, biasing cell measurements of or from the UE 115 to prompt a cell reselection by the network, releasing a communication link with a cell associated with the first communication resource, or performing a UE-initiated reselection to a new cell associated with the second communication resource, among other techniques. By initiating such a transition, the UE 115 may be able to receive the PWS information more quickly (e.g., using the second communication resource) or more efficiently (e.g., by avoiding ongoing monitoring or processing of the first communication resource) than if the UE 115 attempted to receive the PWS information using the first communication resource, among other benefits.

The UEs 115 and the base stations 105 of the wireless communications system 100 may additionally support techniques which enable UEs 115 to maintain multiple "message buffers" for storing received PWS segments. The use of multiple message buffers may improve the reception and storage of PWS segments as the UE moves from cell to cell. In particular, if a UE 115 of the wireless communications system 100 moves between multiple cells which are included within a same geographical scope of PWS information, the UE 115 may maintain multiple message buffers for storing received PWS segments, and may attempt to receive and decode the full PWS information based on PWS segments stored within each of the respective message buffers.

For example, a UE 115 of the wireless communications system 100 may move from a first Cell A to a new Cell B. In this example, if the UE 115 determines that the new Cell B is included within the same geographical scope associated with PWS information received on the previous Cell A (e.g., PWS information received via Cell A applies to Cell B), the UE 115 may maintain multiple message buffers for the respective cells rather than discarding PWS segments received via the previous Cell A, which may reduce how much time it takes for the UE to receive and decode the full PWS information. For instance, the UE 115 may maintain a Buffer AB which for storing PWS segments received via Cell A and Cell B, as well as a Buffer B for storing PWS segments received via Cell B. By maintain PWS segments received via Cell A within Buffer AB, the UE 115 may reduce a time it takes to receive and decode all the segments of the PWS information. Conversely, if the new Cell B is not included within the geographical scope of the PWS information, the UE may discard PWS segments received via Cell A, as the PWS information received on Cell A does not apply to the new Cell B.

Figure 2:
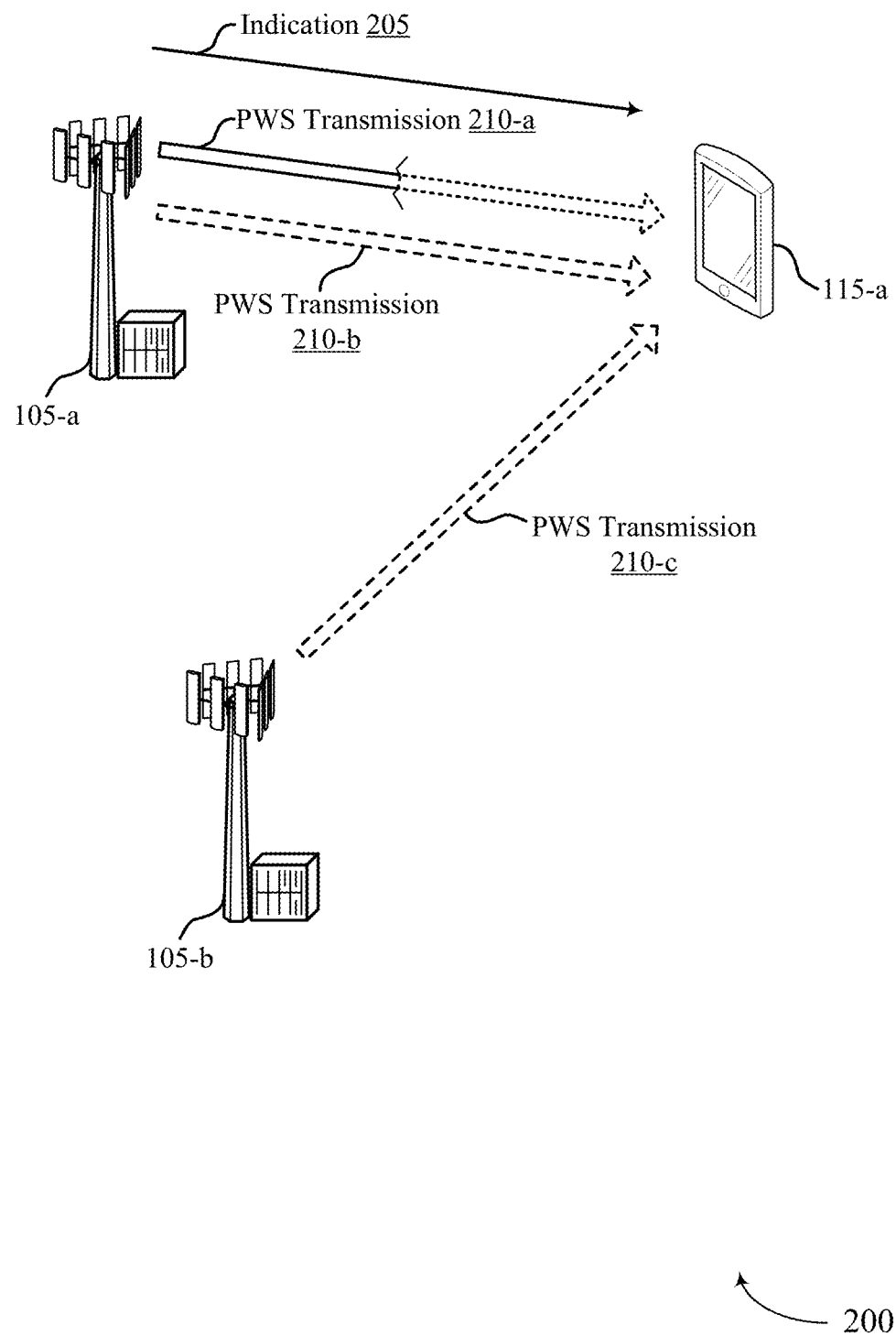
FIG. 2 illustrates an example of a wireless communications system that supports techniques for handling PWS information using multiple message buffers in accordance with aspects of the present disclosure.

FIG. 2 illustrates an example of a wireless communications system 200 that supports techniques for handling PWS information using multiple message buffers in accordance with aspects of the present disclosure. In some examples, the wireless communications system 200 may implement aspects of the wireless communications system 100. For example, wireless communications system 200 may include a UE 115-*a*, and one or both of a base station 105-*a* or a base station 105-*b*, which may be examples of the respective devices described with reference to FIG. 1. In some examples, the base station 105-*a* and the base station 105-*b* (where present) may be connected with a network, such as a core network 130 described with reference to FIG. 1.

The wireless communications system 200 may be configured to provide system information to the UE 115-*a*, including providing such information according to a system acquisition procedure. When system information is provided from the base station 105-*a*, such a procedure may include the base station 105-*a* transmitting a master information block (MIB) and a first SIB (e.g., SIB1) to the UE 115-*a*, which may include a broadcast transmission. Additionally or alternatively, in some examples, the UE 115-*a* may transmit a system information request message to the base station 105-*a*, and the base station 105-*a* may respond by transmitting one or more system information messages to the UE 115-*a*. Based at least in part on such an exchange, the UE 115-*a* may operate in a connected mode, which may involve a network transaction moving the UE 115-*a* to the connected mode. In some examples (e.g., following a connection establishment, following initiation of a connected mode), the base station 105-*a* may transmit an RRC reconfiguration message to the UE 115-*a*, which may include one or more dedicated SIBs (e.g., one or more SIBs dedicated for the UE 115-*a*), to which the UE 115-*a* may respond by transmitting an RRC reconfiguration complete message.

In some examples, a first SIB (e.g., SIB1) may be broadcast by the base station 105-*a*, which may be included in a periodically broadcast transmission (e.g., according to a configured transmission interval). For example, the SIB1 may be transmitted on a downlink shared channel (DL-SCH) with a periodicity of 160 ms (e.g., a default periodicity, a maximum periodicity), or a variable transmission repetition periodicity within (e.g., shorter than) 160 ms, according to certain communications standards. In some examples, a default transmission repetition periodicity for transmitting SIB1 may be 20 ms but an actual transmission repetition periodicity may be determined according to various network implementations of the wireless communications system 200.

The UE 115-*a* may monitor for (e.g., decode and process) SIB1, which may provide the UE 115-*a* with scheduling information for other system information including SIB type, validity information, system information periodicity, or SI-window information, among other information. In some examples, if an OSI search space is enabled (e.g., in a broadcast transmission by the base station 105-*a*, in transmission of the base station 105-*a* that is dedicated for the UE 115-*a*, for a particular BWP of a radio frequency spectrum), the UE 115-*a* may send a system information request to read OSI messages, and the UE 115-*a* may monitor the system information window of the requested system information (e.g., the requested SIB) in one or more periodicities associated with the requested SI. In some examples, such an approach may be applied when requesting or monitoring SIBs (e.g., SIB6, SIB7, SIB8) over a broadcast channel when supported by the network (e.g., by the base station 105-*a*). Additionally or alternatively, in some examples, the network (e.g., the base station 105-*a*) may be configured to transmit one or more SIBs via dedicated signaling (e.g., an RRC reconfiguration message), which may include a dedicated delivery for SIB1, a dedicated delivery for one or more OSI messages (e.g., dedicatedSystemInformationDelivery), or both.

In some examples, system information (e.g., a SIB, PWS information) may be configured according to a certain quantity of segments for certain messages. For example, SIB7 and SIB8 may be configured with up to 64 segments to form a complete message (e.g., a warning message, a PWS message). To properly receive a SIB, or portion thereof (e.g., a SIB message), the UE 115-*a* may need to receive and decode each of the corresponding segments, which may involve assembling the message from the corresponding segments. In some examples, the UE 115-*a* may not discard received segments until a message has been successfully assembled, or the UE 115-*a* may not discard received segments unless a message has not been successfully assembled within a threshold (e.g., configured) duration. In other words, if a message has not been successfully assembled by the UE 115-*a* within a threshold period of time, the UE 115-*a* may discard stored segments or other information associated with the message. For example, for a warning message to be communicated over SIB7, the UE 115-*a* may be configured to discard any stored warning message segment(s), and the current value of a message identifier and serial number for SIB7, if the complete warning message has not been assembled within a period of three hours (e.g., a duration associated with an RRC, a network-defined duration, a specification-defined duration). In another example, for a warning message to be communicated over SIB8, the UE 115-*a* may be configured to discard any stored warning message segment(s) and a warning area coordinate segment (if any), and the associated values of a message identifier and serial number for SIB8, if the complete warning message and the geographical area coordinates (if any) have not been assembled within a period of three hours. In some examples, attempting ongoing monitoring and decoding for such warning information (e.g., until satisfying a configured threshold duration, such as a 3-hour timer) may be associated with undue power consumption by the UE 115-*a*, or undue delay in receiving such warning information, when other communication errors may be preventing successful communication of the warning information.

For example, the UE 115-*a* may receive (e.g., from the base station 105-*a*) an indication 205 of a presence of PWS information and, in response, the UE 115-*a* may attempt to receive the PWS information via a PWS transmission 210-*a* over a first communication resource. However, for various reasons including those described herein, the UE 115-*a* may not be able to successfully receive (e.g., decode, process, assemble) the PWS information from the PWS transmission 210-*a*. For example, if the UE 115-*a* is able to decode paging (e.g., an example of an indication 205) that indicates a presence of PWS information, but is unable to read a SIB1 or OSI in the PWS transmission 210-*a* due to a configuration error (e.g., when SIB1 or OSI is not present as indicated by the paging), the UE 115-*a* may unsuccessfully attempt to receive the PWS information (e.g., via the PWS transmission 210-*a*). When operating in an idle mode, for example, the UE 115-*a* may receive paging indicating a PWS update, but may not be able to read the corresponding OSIs in the PWS transmission 210-*a* (e.g., when a paging search space is not present). In another example, when operating in a connected mode, the base station 105-*a* may be configured to transmit the PWS information via dedicated messaging of the PWS transmission 210-*a*, but if the UE 115-*a* is unable to receive (e.g., decode, process, assemble) the PWS information from the PWS transmission 210-*a*, it may be unclear how long the UE 115-*a* should wait for such PWS information via dedicated messaging.

In some examples, a first SIB may be included in the indication 205 to indicate a presence of PWS information in another SIB that is included in the PWS transmission 210-*a*. For example, when scheduling information for SIB8 (e.g., of a PWS transmission 210-*a*) is included in SIB1 (e.g., of an indication 205), SIB8 may need to be monitored for reception via PWS transmission 210-*a* (e.g., over a first communication resource) as long as such scheduling information is present in SIB1. However, SIB1 may include a misconfiguration or other error, such that the SIB8 or segments thereof may be invalid. For example, SIB8 may include a null message identifier (e.g., msg_id 0) or a message identifier that is out of range (e.g., outside an ETWS or CMAS range), or a first segment may be received without a corresponding or mandatory data coding scheme (e.g., due to a network misconfiguration). In some examples, it may be unclear how long the UE 115-*a* should keep attempting to read or decode the PWS information or other message using the configured communication resource of the PWS transmission 210-*a*.

In another example, SIB7 of a PWS transmission 210-*a* may be decoded, and not stopped for invalid messages as complete segments may not be received. Additionally or alternatively, segments of PWS information of the PWS transmission 210-*a* may not be assembled completely by the UE 115-*a* (e.g., due to a missing segment, due to an invalid or misconfigured segment). For example, decoding may not be actively ongoing, such as when the network has stopped scheduling the PWS information, or if the UE 115-*a* has reselected to a different cell (e.g., of the base station 105-*a*, of the base station 105-*b*) that does not have the scheduling information. In another example, the UE 115-*a* may be receiving segments over the PWS transmission 210-*a*, but may not be able to assemble them completely, under conditions such as a network misconfiguration (e.g., when the same segments are sent), or poor or degraded radio conditions, among other conditions.

Thus, according to these and other conditions, the UE 115-*a* may experience undue delays in receiving PWS information when segments of a PWS information message (e.g., of the PWS transmission 210-*a*, using a first communication resource) are unable to be received or properly assembled, which may be associated with the UE 115-*a* missing critical information. Moreover, since the UE 115-*a* may continue to attempt to read or otherwise receive PWS information (e.g., via SIB1, SIB7, or SIB8) on a misconfigured network (e.g., using the first communication resource of the PWS transmission 210-*a*), the UE 115-*a* may unnecessarily consume power.

In accordance with examples as disclosed herein, the UE 115-*a* may identify a presence of PWS information (e.g., based on an indication 205 such as a paging signal or SIB) and evaluate whether the PWS information can be successfully received (e.g., decoded, processed) using a first communication resource (e.g., of a PWS transmission 210-*a*), such as a first BWP of a radio frequency spectrum, a first communication link (e.g., via a first cell, via a first network node, via the base station 105-*a*), or other resource configuration. If the UE 115-*a* determines that it is unable to receive the PWS information using the first communication resource (e.g., upon an expiration of a timer or counter), the UE 115-*a* may initiate a transition to a second communication resource, such as a second (e.g., different) BWP or communication link to monitor for the indicated PWS information. In various examples, a second communication resource may be associated with a PWS transmission 210-*b* of a same base station 105 (e.g., base station 105-*a*), or a PWS transmission 210-*c* of a different base station 105 (e.g., base station 105-*b*), which the UE 115-*a* may monitor for PWS information that was unable to be received over the PWS transmission 210-*a*.

In some examples, initiating a transition to a new communication resource may include the UE 115-*a* initiating a transition to a new BWP. To initiate a transition to a new BWP, the UE 115-*a* may transmit an indication (e.g., to the base station 105-*a*) that the UE 115-*a* is missing a configuration of one or more search spaces in a first BWP, which may trigger the network to configure the UE 115-*a* for communications with a new BWP, among other operations.

In some examples, initiating a transition to a new communication resource may include the UE 115-*a* indicating a RLF with the base station 105-*a*, which may prompt the network to configure the UE 115-*a* for a new communication link with the base station 105-*b*, or a new or reconfigured communication link with the base station 105-*a*. In some examples, initiating a transition to a new communication resource may include the UE 115-*a* releasing a communication link with a cell associated with the first communication resource (e.g., releasing a communication link with the base station 105-*a*), or performing a UE-initiated reselection to a new cell associated with the second communication resource (e.g., a new cell of the base station 105-*a*, a new cell of the base station 105-*b*).

In some examples, initiating a transition to a new communication resource may include the UE 115-*a* biasing cell measurements to prompt a cell reselection by the network (e.g., to a new cell of the base station 105-*a*, to a new cell of the base station 105-*b*). For example, the UE 115-*a* may bias or otherwise indicate relatively poorer or unfavorable cell measurements for the first communication resource (e.g., for a cell associated with the PWS transmission 210-*a*), or bias or indicate relatively better or favorable cell measurements for a second communication resource (e.g., for a cell to be associated with a PWS transmission 210-*b*, or a PWS transmission 210-*c*, or both).

By initiating such a transition (e.g., to monitor for or receiving warning information via a PWS transmission 210-*b*, or via a PWS transmission 210-*c*, or both), the UE 115-*a* may be able to receive the PWS information more quickly or more efficiently than if the UE 115-*a* attempted to receive the PWS information using the first communication resource (e.g., via PWS transmission 210-*a*), among other benefits.

In a first example, the UE 115-*a* may have received a downlink control information (DCI) paging update (e.g., an indication 205 that indicates a presence of PWS information), but may be unable to read SIB1 or one or more OSI messages that include one or more segments of the PWS information. In such scenarios, upon receiving the paging signal, the UE 115-*a* may be configured to start a timer for each of the one or more segments as well as an overall timer (e.g., an overarching timer) associated with receiving or decoding the indicated PWS information. In some examples, the base station 105-*a* may be configured (e.g., by the network) to transmit updated SIBs to the UE 115-*a* via dedicated SIBs, such as when the UE 115-*a* is operating in a connected mode or state. In some examples, however, a paging signal may indicate a presence of PWS information but, due to a configuration error, SIB1 may not be able to be read or otherwise received or decoded successfully (e.g., if SIB1 search space is not configured, if OSI search space is not configured but paging and SIB1 search space are configured). Upon expiration of a threshold duration (e.g., upon expiration of one or more timers associated with receiving PWS information, such as an overarching timer, a per-segment timer, or both), if the UE 115-*a* has not successfully received the PWS information (e.g., has not received dedicated SIBs associated with receiving the PWS information in a connected mode), the UE 115-*a* may initiate a transition to a different communication resource (e.g., associated with a PWS transmission 210-*b*, or a PWS transmission 210-*c*, or both). Initiating such a transition may include the UE 115-*a* triggering a switch to a different BWP, triggering or indicating a RLF (e.g., transmitting a reestablishment message to the network), biasing cell measurements communicated to the base station 105-*a* such that the network triggers a handover (e.g., to a different cell), or performing a local release of a cell to acquire SIB1 in an initial BWP (e.g., when operating in a connected mode, which may be possible even if an initial BWP has an improper search space configuration), or triggering a panic cell reselection (e.g., when the UE 115-*a* is operating in an idle mode, if OSI messages are not able to be read properly).

In a second example, the UE 115-*a* may have identified a presence of PWS information based on scheduling information included in a SIB1 message of an indication 205, and may attempt to decode PWS information from other SIBs of a PWS transmission 210-*a* (e.g., SIB7, SIB8) until such scheduling information is removed from SIB1. In some examples (e.g., for SIB7), upon receiving or assembling such SIBs, the UE 115-*a* may stop monitoring or decoding for the SIB, such as when a network configuration indicates that, once a complete message is formed, decoding may stop. In some examples, for each of a set of one or more SIBs (e.g., for SIB7, for SIB8), a timer may be initiated per segment of the SIB (e.g., a per-segment timer), and a valid segment (e.g., of PWS information) being received either via broadcast signaling (e.g., a broadcast channel) or dedicated signaling may be used to reset the timer. If a segment is not received, or if a segment is discarded due to invalid contents within the timer duration, upon expiration of such a timer (e.g., upon expiration of the per-segment timer), the UE 115-*a* may initiate a transition to a different communication resource such as triggering or indicating a RLF, biasing cell measurements communicated to the base station 105-*a* such that the network triggers a handover, performing a local release of a cell, or performing a panic cell reselection, including various examples of such operations as described herein.

In some examples, by not storing invalid segments, a longer-duration timer associated with SIB decoding failure (e.g., a timer associated with an RRC configuration, an 8-hour timer) may not be started, or such a threshold duration may not be reached. For example, because a segment-specific timer approach may support an evaluation of whether PWS information can be received in a matter of a few seconds (e.g., by segment, rather than a 3-hour SIB decoding timer used in other circumstances, such as for a PWS message as a whole), the UE 115-*a* may be able to move to a different communication resource more quickly, and with fewer unsuccessful decoding attempts. Thus, the UE 115-*a* may attempt to receive the PWS information more quickly and, if the UE 115-*a* had been camped on a bad cell or rogue cell, the UE 115-*a* may move to a different cell with an improved configuration to receive the PWS information and avoid undue power consumption.

In a third example, the UE 115-*a* may have received one or more segments of PWS information, but may not be able to assemble them completely. In such an example, the UE 115-*a* may wait through a duration associated with an RRC configuration (e.g., a specification-defined timer, a 3-hour timer) in an effort to receive all of the PWS information segments. In such examples, the UE 115-*a* may instead take an intermediate approach, particularly if a PWS message is critical (e.g., according to a configured list of critical messages, such as a list of msg_ids and ETWS and CMAS IDs that are critical). Thus, for critical PWS messages, the UE 115-*a* may employ a more aggressive (e.g., faster) timeout than waiting for an entire duration of a configured SIB decoding timer (e.g., rather than remaining on a first communication resource according to a 3-hour timeout timer).

In such an example, the UE 115-*a* may employ a combination of timers, which may be referred to as an overarching timer and an interruption timer. In one example, an overarching timer may be defined according to Equation (1) below:

$$\text{Overarching\_timer} = (\text{SI\_periodicity} * \text{Num\_segments}) * \text{num\_attempts\_per\_segment} \quad (1)$$

In some examples, SI_periodicity may refer to the periodicity at which system information repeats, and a default value could be maximum value (e.g., 5.12 seconds). In some examples, Num_segments may refer to a quantity of segments in a given message (e.g., a PWS information message), which may refer to a number of available or remaining segments if one or more segments has already been received, or may be equal to a maximum quantity of segments (e.g., 64 segments, an entire quantity of segments associated with the PWS information). In some examples, num_attempts_per_segment may refer to a configured quantity of attempts for each segment. Accordingly, in one example, a worst case value of Overarching_timer, for a configuration with SI_periodicity of 5.12 seconds, Num_segments equal to 64 segments, and a num_attempts_per_segment of five attempts per segment, may be 1638.4 seconds, or approximately 27 minutes, which may be an overall duration permitted to attempt to retrieve the associated PWS information before initiating a transition to a new communication resource for further attempts to retrieve the associated PWS information. In various examples, any one or more of the parameters for determining such an overarching timer may be based at least in part on a severity of criticality of the PWS information, such as being based on an ETWS ID, a CMAS ID, or other identifier.

In some examples, the UE 115-a may start an overarching timer as soon as PWS information for SIB7 or SIB8 is scheduled (e.g., upon receiving or processing an indication 205 that includes such scheduling). In some examples, if a segment is successfully received or processed, but there are still pending segments, the timer may be recalculated according to Equation (1) using a remaining quantity of segments (e.g., for the parameter Num_segments), or the timer may be adjusted such that a new timer value equals the value calculated according to Equation (1) minus an expired value of the overarching timer (e.g., shortening a duration of the overarching timer based on successful reception or processing of one or more segments).

In some examples, an interruption timer may be provided to support various interruptions such as an RLF procedure, reselection, or handover operations (e.g., as a guard to the overarching timer). Such an interruption timer may be added to a value of the overarching timer, or an overarching timer may be paused or stopped during a duration of the interruption timer or the during the interruption itself. For example, the UE 115-a may be configured with a handover timer (e.g., a T304 timer), and the duration of the interruption timer may be greater than a duration of the handover timer. Thus, the interruption timer may be started and running while performing operations such as handover or cell selection or reselection, among other types of interruptions which may prevent the interruption timer from reaching a threshold time unnecessarily quickly (e.g., in an overly conservative manner).

Upon expiration of the overarching timer, the UE 115-a may initiate a transition to a second communication resource. For example, such a transition may be initiated by performing a panic reselection (e.g., if the UE 115-a is operating in an idle mode) or, if the UE 115-a is operating in a connected mode, the UE 115-a may trigger an RLF, or bias cell measurements to trigger the network to initiate a handover to a new cell, or the UE 115-a may perform a local release and trigger idle mode handling, such as performing a panic reselection.

As noted previously herein, system information (e.g., a SIB, PWS information) may be configured according to a certain quantity of segments for certain messages. For example, SIB7 and SIB8 may be configured with up to 64 segments to form a complete message (e.g., a warning message, a PWS message). To properly receive a SIB, or portion thereof (e.g., a SIB message), the UE 115-a may need to receive and decode each of the corresponding segments, which may involve assembling the message from the corresponding segments. In the context of SIB7 and SIB8, the periodicity of each segment may be eight frames (80 ms). As such, in the case of 64 segments, all of the segments for the respective SIB or PWS information may be received within 64*80 ms=5.12 seconds. However, if the network transmits any of the segments with multiple repetitions, or if any segment is not received at the UE 115-a, the time required to receive all the segments of the respective message may be increased significantly. For example, if the periodicity for each segment is 512 frames, then all 64 segments can be received at the UE 115-a within 64*5120=327.68 seconds, or 5.46 minutes.

In other words, the UE 115-a may have to wait 5.46 minutes between receiving the first and last segments of the PWS information. It is possible and even probable that the UE 115-a may undergo a cell reselection procedure (e.g., idle) or handover procedure (in connected mode) within this timeframe (e.g., within the 5.46 minute timespan). Some UEs 115 may not be configured to collect PWS segments across cells, and may therefore be configured to discard all accrued PWS segments upon moving to a new cell. In such cases, the UE 115 may have to start from scratch, and may begin accruing PWS segments in the new cell. This may be the case even when the system information (SIB, PWS information) may be the same across the respective cells. As such, some conventional PWS reception techniques implemented by some UEs 115 may increase a time it takes to acquire all segments of a message when moving between cells, which may delay the delivery of PWS information and other important messages to the UE 115.

Accordingly, to improve PWS information acquisition in cases where the UE 115-a moves between cells, the UE 115-a and the base station 105-a of the wireless communications system 200 may be configured to support techniques which enable the UE 115-a to maintain multiple "message buffers" for storing received PWS segments. The use of multiple message buffers may improve the reception and storage of PWS segments as the UE moves from cell to cell. In particular, if a UE 115 of the wireless communications system 100 moves between multiple cells which are included within a same geographical scope of PWS information, the UE 115 may maintain multiple message buffers for storing received PWS segments, and may attempt to receive and decode the full PWS information based on PWS segments stored within each of the respective message buffers.

The use of multiple message buffers is further shown and described with reference to FIG. 3.

Figure 3:
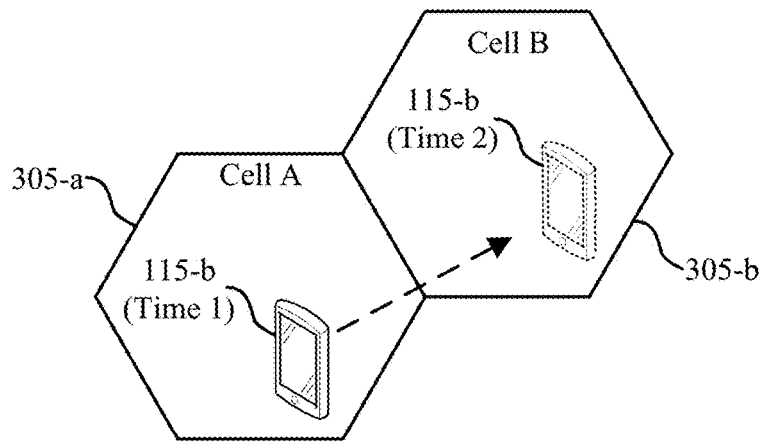
FIG. 3 illustrates an example of a wireless communications system that supports techniques for handling PWS information using multiple message buffers in accordance with aspects of the present disclosure.
Figure 3:
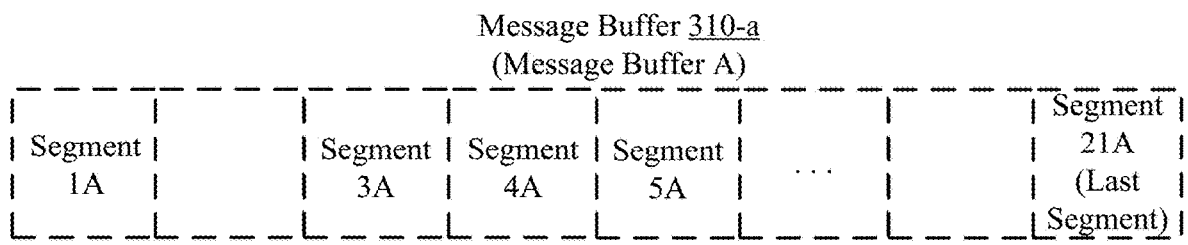
Figure 3:
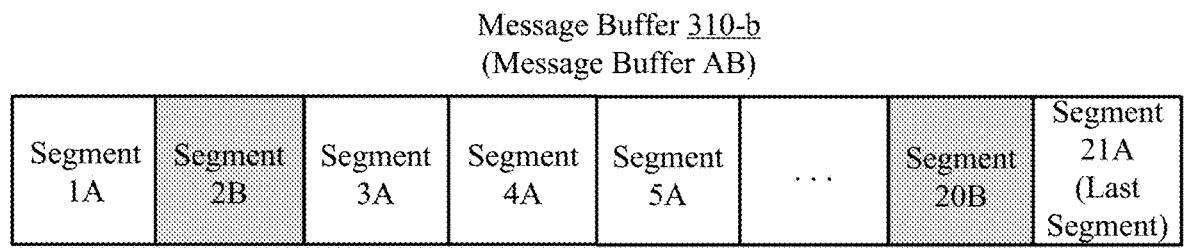
Figure 3:
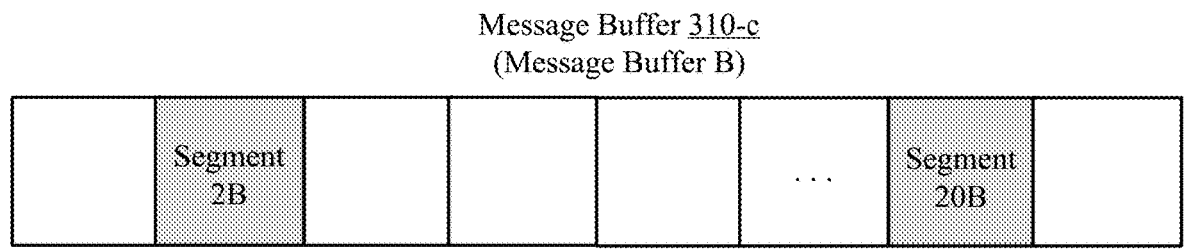

FIG. 3 illustrates a wireless communications system 300 that supports techniques for handling PWS information using multiple message buffers in accordance with aspects of the present disclosure. Aspects of the wireless communications system 300 may implement, or may be implemented by, aspects of the wireless communications system 100, wireless communications system 200, or both. For example, the wireless communications system 300 illustrated in FIG. 3 may include a UE 115-b, which may include an example of the UE 115-a illustrated in FIG. 2.

The UE 115-b may communicate with a network via one or more cells 305, including a first cell 305-a (e.g., Cell A) and a second cell 305-b (e.g., Cell B). In some implementations, the first cell 305-a and the second cell 305-b may be supported by the same base station 105 (e.g., base station 105-a illustrated in FIG. 2). Additionally, or alternatively, the first cell 305-a and the second cell 305-b may be supported by different base stations 105. As shown in FIG.

3, the UE 115-*b* may be positioned within (and configured to communicate with) the first cell 305-*a* at Time 1, and may subsequently be positioned within (and configured to communicate with) the second cell 305-*b* at Time 2. For example, the UE 115-*a* may perform a cell handover procedure between Time 1 and Time 2.

In some aspects, the network of the wireless communications system 300 may be configured to transmit (e.g., broadcast) PWS information. As noted previously herein, PWS information may be transmitted as separate segments, where the UE 115-*b* is configured to receive and assemble each segment to fully receive and decode the PWS information. In this regard, the UE 115-*a* may be configured to receive segments of PWS information via the first cell 305-*a* at Time 1, and may be configured to receive segments of PWS information via the second cell 305-*b* at Time 2.

In some implementations, segments of PWS information may be cell-specific. That is, segments of PWS information received via the first cell 305-*a* may not be applicable to the second cell 305-*b*, and vice versa. In such cases, the PWS information may include a "geographical scope" of a single cell 305. For the purposes of the present disclosure, the term "geographical scope" may refer to a defined area or region in which PWS information is considered to be valid or applicable. In additional or alternative implementations, PWS information may be associated with a geographical scope that spans multiple cells 305. For example, PWS information may be associated with a geographical scope which includes both the first cell 305-*a* and the second cell 305-*b*, such that segments of the PWS information received via the first cell 305-*a* are valid for the second cell 305-*b*, and vice versa. A geographical scope may include a set of cells 305, a public land mobile network (PLMN), or tracking area (e.g., tracking area code (TAC)).

Segments of PWS information may include information or fields which indicate the geographical scope of the respective PWS information. For example, segments of PWS information may include a serial identifier (serial-id) (e.g., serial identifier field(s)) which indicates the geographical scope of the PWS information. Thus, the UE 115-*b* may be configured to serial identifiers of received PWS segments to determine the geographical scope of the underlying PWS information, and therefore determine whether segments received on one cell 305 (e.g., first cell 305-*a*) are valid or applicable to other cells 305 (e.g., second cell 305-*b*).

In cases where the geographical scope of PWS information is cell wide (e.g., geographical scope is a single cell), the UE 115-*b* may be configured to identify that previously-received PWS segments are no longer valid, and may therefore be discarded. In other words, no action may be taken at the UE 115-*b* with respect to maintaining previously-received PWS segments, and per-segment timeouts may not trigger cell change procedures. For example, the UE 115-*b* may receive PWS segments via the first cell 305-*a*, and may subsequently move to the second cell 305-*b*. In cases where the geographical scope of the PWS information associated with the first cell 305-*a* is cell-wide (e.g., only applies to the first cell 305-*a*), the UE 115-*b* may identify that the previously-received PWS segments are not valid for the new target cell (e.g., the second cell 305-*b*), and may therefore discard the previously-received PWS segments.

Conversely, in cases where the UE 115-*b* changes cells 305, but the geographical scope of PWS information includes both the original cell 305 and target cell 305, techniques described herein may enable the UE 115-*b* to maintain multiple message buffers 310 for storing the PWS segments received via the respective cells 305. The use of multiple message buffers 310 may enable the UE 115-*c* to maintain previously-received PWS segments, and potentially reduce a duration of time it takes for the UE 115-*b* to receive all of the PWS segments and decode the corresponding PWS information.

For example, as shown in FIG. 2, the UE 115-*b* may receive PWS segments associated with PWS information via the first cell 305-*a* at Time 1. For example, the UE 115-*b* may receive Segments 1, 3, 4, 5, and 21 via the first cell 305-*a*. The PWS information corresponding to the received PWS segments may be associated with a geographical scope that includes at least the first cell 305-*a*. The UE 115-*b* may store PWS segments received via the first cell 305-*a* in a first message buffer 310-*a* (Message Buffer A), as shown in FIG. 2. Subsequently, the UE 115-*b* may move to the second cell 305-*b*. For example, the UE 115-*b* may perform a cell change procedure (e.g., handover procedure, cell selection/reselection procedure) to attach to the second cell 305-*b*. In other words, the UE 115-*b* may give preference to cells 305 included within the geographical scope of the PWS information when making decisions regarding cell change procedures. That is, the UE 115-*b* may perform the cell change procedure (e.g., perform a handover procedure, bias measurements to force a cell reselection procedure) to the second cell 305-*b* based on the second cell 305-*b* being included within the geographical scope.

Continuing with the same example, the UE 115-*b* may acquire a SIB (e.g., SIB1) from the second cell 305-*b*, where the SIB includes PWS scheduling information associated with the second cell 305-*b*. In other words, a SIB1 message received via the second cell 305-*b* may indicate resources that the UE 115-*b* is to monitor for PWS information on the second cell 305-*b*. The UE 115-*b* may receive additional PWS segments (e.g., Segments 2, 20) via the second cell 305-*b*. For example, the UE 115-*b* may receive additional PWS segments based on the PWS scheduling information indicated via the SIB which was received from the second cell 305-*b*. Upon receiving PWS segments via the second cell 305-*b*, the UE 115-*b* may be configured to determine whether PWS segments were previously received via the first cell 305-*a* should be kept or discarded. In particular, the PWS segments received via the second cell 305-*b* may be associated with the same PWS information as the PWS segments received via the first cell 305-*a* or different PWS information. As such, if the PWS segments received via the first cell 305-*a* and the second cell 305-*b* correspond to different PWS information (e.g., different PWS messages), the PWS segments received via the first cell 305-*a* may not be applicable to the second cell 305-*b*, and may therefore be discarded. Stated differently, if the geographical scope of PWS information corresponding to PWS segments received via the first cell 305-*a* does not include the second cell 305-*b* (e.g., the second cell 305-*b* is not included within the geographical scope of the PWS information on the first cell 305-*a*), the UE 115-*b* may determine that the PWS segments received via the first cell 305-*a* do not apply to the second cell 305-*b*, and may therefore be discarded.

Accordingly, upon receiving PWS segments via the second cell 305-*b*, the UE 115-*b* may be configured to identify whether the second cell 305-*b* is included within the geographical scope of the PWS segments received via the first cell 305-*a*. In some cases, the geographical scope may be indicated via serial identifiers (serial-ids) of the PWS segments received via the second cell 305-*b*. In this regard, the UE 115-*b* may determine whether the second cell 305-*b* is included in the geographical scope based on serial identifiers of the PWS segments received via the second cell 305-*b*.

In cases where the UE 115-*b* determines that the second cell 305-*b* is not included within the geographical scope, the UE 115-*b* may determine that the PWS segments received via the first cell 305-*b* are not valid or applicable for the second cell 305-*b*, and may therefore discard the PWS segments received via the first cell 305-*a* (e.g., discard Segments 1, 3, 4, 5, 21, and/or message buffer 310-*a*).

Conversely, if the UE 115-*b* determines that the second cell 305-*b* is included in the geographical scope (e.g., geographical scope matches and/or geographical scope includes both cells 305-*a* and 305-*b*), the UE 115-*a* may be configured to maintain PWS segments received via the first cell 305-*a* and maintain multiple message buffers 310. In particular, the UE 115-*b* may keep PWS segments received via the first cell 305-*a* based on the geographical scope matching, PWS scheduling information for the second cell 305-*b* being present, and serial identifiers (serial-ids) and message identifiers (message-ids) across the first cell 305-*a* and the second cell 305-*b* matching (e.g., being the same).

For example, if the geographical scope of the PWS information is PLMN-wide and serial identifiers of the PWS segments received via both the first cell 305-*a* and the second cell 305-*b* is the same, then the UE 115-*b* may determine that PWS information (e.g., cell broadcast system (CBS) message) has not been changed across cells 305, and that PWS segments received via the first cell 305-*a* may be maintained. In some cases, there is a possibility that the PWS information (CBS message) has been changed across cells. However, the satisfaction of the conditions above (e.g., same geographical scope, same serial-ids) may be sufficient for the UE 115-*b* to maintain PWS segments received via the first cell 305-*a* to maintain the possibility of successful concatenation of PWS segments across cells 305.

Upon confirming that the first cell 305-*a* and the second cell 305-*b* are both included within the geographical scope of the PWS information (e.g., geographical scope matches), the UE 115-*b* may be configured to maintain multiple message buffers 310 for storing received PWS segments. For example, as shown in FIG. 3, upon confirming that the first cell 305-*a* and the second cell 305-*b* are both included within the geographical scope of the PWS information, the UE 115-*b* may be configured to maintain a message buffer 310-*b* (Message Buffer AB) associated with both the first cell 305-*a* and the second cell 305-*b*, and a second message buffer 310-*c* associated with the second cell 305-*b*. In other words, the message buffer 310-*b* may be configured to store or accumulate PWS segments received via both the first cell 305-*a* and the second cell 305-*b*, where the message buffer 310-*c* may be configured to store or accumulate PWS segments received only via the second cell 305-*b* (e.g., accrue PWS segments only on the current target cell 305).

In this regard, PWS segments received via the second cell 305-*b* may be stored in both message buffer 310-*b* and message buffer 310-*c*. For example, as shown in FIG. 3, Segment 2 of the PWS segment may be received via the second cell 305-*b* and may be stored in both the message buffer 310-*b* and message buffer 310-*c*. In some aspects, the UE 115-*b* may be configured to store segments within the respective message buffers 310-*b*, 310-*c* based on serial identifiers (serial-ids) and message identifiers (message-ids) matching across segments received via the respective cells 305.

In some cases, the UE 115-*b* may convert the message buffer 310-*a* (Message Buffer A) into the message buffer 310-*b* (Message Buffer AB). In other cases, the UE 115-*b* may make a new message buffer 310-*b*, transfer or copy PWS segments from the message buffer 310-*a* into the message buffer 310-*b*, and discard the message buffer 310-*a*.

In some implementations, if a last segment (e.g., sequentially last segment) in the message buffer 310-*b* is different from a last segment (e.g., sequentially last segment) in message buffer 310-*c*, then the UE 115-*b* may be configured to identify that concatenation across the cells 305-*a* and 305-*b* is not possible, and may be configured to discard message buffer 310-*b*. For example, if the UE 115-*b* were to receive Segment 21 (e.g., Segment 21B) via the second cell 305-*b*, and the Segment 21B received via the second cell 305-*b* were different from Segment 21A received via the first cell 305-*a*, the UE 115-*b* may be configured to identify that concatenation across the cells 305-*a* and 305-*b* is not possible, and may be configured to discard message buffer 310-*b*. This conclusion may be arrived at only if the sequentially last segments on both the first cell 305-*a* and the second cell 305-*b* are known.

Moreover, even in cases where the geographical scope of the PWS information includes both the first cell 305-*a* and the second cell 305-*b*, the UE 115-*a* may be configured to identify that concatenation is not possible across the cells if lengths of PWS segments corresponding to the same PWS segment and received via the respective cells 305-*a* and 305-*b* is different. For example, if a length of a segment #x received via the first cell 305-*a* is different from a length of same segment #x received via the second cell 305-*b* (e.g., segment corresponding to the same PWS segment of the PWS information), the UE 115-*b* may be configured to determine that concatenation across the cells 305 is not possible, and may thereby discard the message buffer 310-*b*. In other words, if the UE 115-*b* were to receive Segment 3 via the second cell (e.g., Segment 1B), and the length of Segment 3A received via the first cell 305-*a* was different from the length of Segment 3B received via the second cell 305-*b*, the UE 115-*b* may be configured to discard message buffer 310-*b* (because concatenation across the cells is not possible).

In other cases, the first cell 305-*a* and the second cell 305-*b* are configured to segment the PWS information differently (e.g., different segmentation configurations, different concatenation configurations), which may make concatenation not possible across the cells 305. For example, the UE 115-*b* may be configured to discard the message buffer 310-*b* if a first segmentation configuration associated with segments received via the first cell 305-*a* is different from a second segmentation configuration associated with segments received via the second cell 305-*b*. In such cases, segments stored in the respective message buffers 310-*b*, 310-*c* may not be built correctly and/or may not be able to be concatenated. For instance, the number of segments of the PWS information broadcasted in the first cell 305-*a* and the second cell 305-*b* may be the same. However, in some cases, the remaining segments received in the second cell 305-*b* may not intersect with the segments received in the first cell 305-*a*, and the length in the remaining segments from the second cell 305-*b* may not match with the same segments which were not received via the first cell 305-*a*. In this example, the message buffer 310-*b* (Message Buffer AB) would not have concatenated correctly, and the UE 115-*b* may therefore be configured to discard the message buffer 310-*b*.

As such, the UE 115-*b* may be configured to discard the message buffer 310-*b* (Message Buffer AB) when certain conditions are met including, but not limited to: all segments have been received (e.g., PWS information is built, complete segment is built); length mismatch of a segment within the respective message buffers 310-*b*, 310-*c*; different sequentially last segments within the respective message buffers 310-*b*, 310-*c*; different serial identifiers within segments received via the respective message buffers 310-*b*, 310-*c*; different message identifiers within segments received via the respective message buffers 310-*b*, 310-*c*; the geographical scope changes; the serial identifier changes; the message identifier changes; a timer expires (e.g., expiration of 3-hour timer).

The UE 115-*b* may be configured to decode the PWS information based on one of the message buffers 310-*b*, 310-*c* being completed (e.g., filled). Upon completion of a message buffer 310-*b*, 310-*c*, the UE 115-*b* may send the completed message buffer 310 to a higher layer at the UE 115-*b* for decoding.

In cases where the UE 115-*b* discards the message buffer 310-*b*, the UE 115-*b* may still be able to receive all the PWS segments of the PWS information via the second cell 305-*b*, and therefore decode the PWS information (by sending the received PWS segments to a higher layer at the UE 115-*b*). In this regard, the message buffer 310-*c* may serve as a "fallback" or "backup" to the message buffer 310-*b* in cases where concatenation across cells is not possible or successful. However, by maintaining multiple message buffers 310, the UE 115-*b* may be able to reduce a time it takes to receive all the segments (and therefore reduce a time to decode the PWS information) in cases where successful concatenation of the message buffer 310-*a* is successful. As such, techniques of the present disclosure may enable the UE 115-*b* to build the complete PWS information message quicker by implementing multiple message buffers 310, which may increase the probability of correctly building the full PWS information message faster. In particular, even in cases where the message buffer 310-*b* (e.g., Message Buffer AB, bufferAcrossCells) is potentially incorrect and concatenation fails, the message buffer 310-*c* (e.g., Message Buffer B, bufferSourceCell, bufferTargetCell) would have the latest set of PWS segments received via the second cell 305-*b*, thereby enabling successful decoding of the PWS information.

Message identifier (message-id) of received PWS segments may be based on the region (e.g., cell 305) may be associated with a defined criticality. Defined criticalities may include presidential alerts, or weather alerts. Moreover, defined criticalities may vary based on country or other region. For example, message identifiers in the European Union (EU) may be classified as Level 1-Level 4 alerts (where Level 1 alerts may not be disabled by users and/or UEs 115), whereas in Korea the same message identifiers may be classified as Class 0 or Class 1. In some cases, PWS information messages which the UE 115-*b* is no able to opt out from may be classified or defined as critical messages (e.g., EU Alert 1, Class 0, Presidential Alert). Moreover, if the UE 115-*b* has enabled message identifiers ids which fall under EU-Alert-2, some class-1, or an imminent threat, the respective message PWS information messages may also be classified as critical messages. Conversely, if a message identifier is not critical, the UE 115-*b* may be able to move to a cell 305 outside of the geographical scope of the PWS information to conserve power and battery life (e.g., by effectively opting-out of the PWS information).

In some aspects, the UE 115-*b* may be configured to maintain one or more timers associated with the PWS information. Further, the UE 115-*b* may be configured to discard received PWS segments and/or message buffers 310 (e.g., message buffer 310-*b*) based on an expiration of a timer associated with the PWS information and/or a timer associated with individual segments received via the first cell 305-*a*, the second cell 305-*b*, or both. The UE 115-*b* may be configured to maintain two separate timers: a per-segment timer, and an overarching timer. In some implementations, the overarching timer may be configured to handle misconfigurations such as receiving the same segments but not all the segments of the PWS information. In such cases, a per-segment timeout would be restarted on each reception of a segment, but the overarching timer (e.g., 3-hour timer) may continue running, which may result in an overarching timeout (e.g., 3-hour timeout), as described previously herein.

In some aspects, the per-segment timeout (e.g., timeout based on a per-segment timer) may be ignored if the geographical scope of the PWS information is cell-wide (e.g., geographical scope including only the first cell 305-*a*). Conversely, the per-segment timeout may not be ignored in cases where the geographical scope includes both cells 305-*a*, 305-*b*, or where the geographical scope includes a PLMN.

In some implementations, upon a timer expiry, the UE 115-*b* may be configured to check if any recently found PLMN matches or TAC matches with the current cell 305 (e.g., cell 305-*b*). If in connected mode, the UE 115-*b* may be configured to bias measurements (e.g., A4 measurements) in order to trigger a cell change procedure (e.g., cell handover procedure) to a new target cell 305. Additionally, or alternatively, the UE 115-*b* may be configured to trigger RLF. Comparatively, if in idle mode, the UE 115-*b* may be configured to trigger reselection to a new target cell 305 upon timer expiry. In such cases, cell selection/reselection measurements or procedures may be biased in such a manner as to favor a transition to a new target cell 305 (e.g., third cell 305) which is included within the geographical scope of the PWS information. In other words, the UE 115-*b* may prioritize target cells 305 which are included within the geographical scope of the PWS information.

The overarching timer may be defined according to Equation 1 above (e.g., Overarching_timer= (SI_periodicity*Num_segment)*num_attempts_per_segment), where SI_periodicity is the periodicity at which system information repeats (e.g., default maximum value of 5.12 seconds). In some examples, Num_segments may refer to a quantity of segments in a given message (e.g., a PWS information message), which may refer to a number of available or remaining segments if one or more segments (e.g., last segment) has already been received, or may be equal to a maximum quantity of segments (e.g., 64 segments, an entire quantity of segments associated with the PWS information). In some examples, num_attempts_per_segment may refer to a configured quantity of attempts for each segment (e.g., x reception attempts per segment). Accordingly, in one example for a worst case value of Overarching_timer may include a SI_periodicity of 5.12 seconds, Num_segments equal to 64 segments, and a num_attempts_per_segment of five attempts per segment. In this worst case, the Overarching_timer may be 1638.4 seconds, or approximately 27 minutes, which may be an overall duration permitted to attempt to retrieve the associated PWS information before initiating a transition to a new communication resource (e.g., new cell 305) for further attempts to retrieve the associated PWS information.

In some implementations, the UE 115-*b* may be configured to trigger the overarching timer (e.g., Overarching_timer) as soon as PWS information for SIB7 and/or SIM is scheduled (e.g., upon receiving or processing the indication 205 in FIG. 2). In some examples, if a segment of the PWS information is successfully received or processed, but there are still pending segments, the timer may be recalculated according to Equation (1) using a remaining quantity of segments (e.g., for the parameter Num_segments), or the timer may be adjusted such that a new timer value equals the value calculated according to Equation (1) minus an expired value of the overarching timer (e.g., shortening a duration of the overarching timer based on successful reception or processing of one or more segments).

Figure 4:
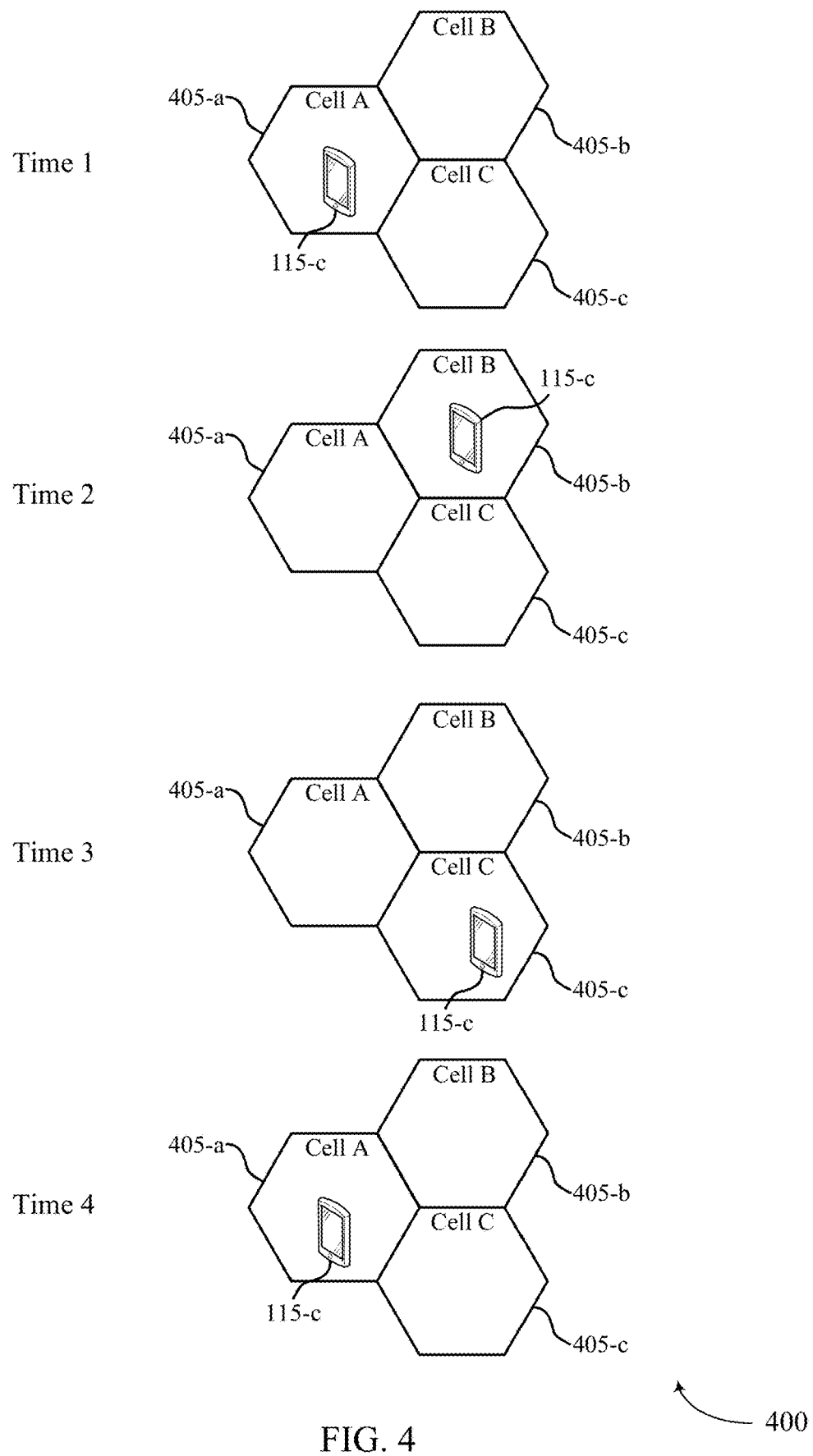
FIG. 4 illustrates an example of a wireless communications system that supports techniques for handling PWS information using multiple message buffers in accordance with aspects of the present disclosure.

FIG. 4 illustrates a wireless communications system 400 that supports techniques for handling PWS information using multiple message buffers in accordance with aspects of the present disclosure. Aspects of the wireless communications system 400 may implement, or may be implemented by, aspects of the wireless communications system 100, wireless communications system 200, wireless communications system 300, or any combination thereof. For example, the wireless communications system 400 illustrated in FIG. 4 may include a UE 115-c, which may include an example of the UE 115-a illustrated in FIG. 2, the UE 115-b illustrated in FIG. 3, or both.

In some cases, a UE 115 may perform multiple cell change procedures (e.g., handover procedures) between cells when acquiring segments for PWS information. In other words, a UE 115 may perform multiple "hops" between target cells when acquiring PWS information. In some cases, each of the respective "hops" or target cells may (or may not be) included within a geographical scope of the PWS information. For example, as shown in FIG. 4, a UE 115-c may be in wireless communication with a network including a first cell 405-a (Cell A), a second cell 405-b (Cell B), and a third cell 405-c (Cell C). In some implementations, the first cell 405-a, the second cell 405-b, and the third cell 405-c may be supported by the same base station 105 (e.g., base station 105-a illustrated in FIG. 2). Additionally, or alternatively, the first cell 405-a, the second cell 405-b, the third cell 405-c, or any combination thereof, may be supported by two or more different base stations 105.

As shown in FIG. 4 the UE 115-c may perform multiple "hops" or cell change procedures between different target cells 405 over time. For example, the UE 115-c may be positioned within (and configured to communicate with) the first cell 405-a at Time 1, within the second cell 405-b at Time 2, within the third cell 405-c at Time 3, and back to the first cell 405-a at Time 4 (e.g., hops from Cells A-B-C-A). In some implementations, each of the cells 405-a, 405-b, 405-c, and 405-d may be included within the geographical scope of PWS information which is transmitted/broadcast on each of the respective cells 405. That is, concatenation of PWS segments may be possible across each of the cells 405 of the wireless communications system 400.

In cases where each of the cells 405 (e.g., target cells 405) are included within the geographical scope of PWS information broadcast by the network of the wireless communications system 400, the UE 115-c may be configured to implement multiple-buffer techniques described herein in order to facilitate efficient reception of PWS information across the cells 405, and thereby expedite decoding of PWS information.

For example, in a first implementation, the UE 115-c may maintain multiple message buffers as the UE 115-c moves between the target cells 405 of the wireless communications system 400 in accordance with Table 1 below:

TABLE 1

| Multi-Message Buffer Handling (Implementation 1) | |
|---|---|
| Hop (Source Cell->Target Cell) | Message Buffers Maintained at UE |
| A->B | Message Buffers AB and B |
| B->C | Message Buffers ABC and C |
| C->A | Message Buffers ABCA and A |

As shown in Table 1, in accordance with a first implementation, the UE 115-c may maintain Message Buffers AB and B upon performing a cell change procedure (e.g., handover procedure) from the first cell 405-a (Cell A) to the second cell 405-b (Cell B). Message Buffer AB may be configured to store PWS segments received via Cell A and Cell B, whereas Message Buffer B may be configured to store PWS segments received via Cell B. Moreover, the UE 115-c may maintain Message Buffers ABC and C upon performing a cell change procedure from the second cell 405-b (Cell B) to the third cell 405-c (Cell C), where Message Buffer ABC may be configured to store PWS segments received via Cells A, B, and C, and Message Buffer C may be configured to store PWS segments received via Cell C. In some implementations, the UE 115-c may be configured to convert Message Buffer AB to Message Buffer ABC upon performing a cell change procedure to Cell C. Additionally, or alternatively, Message Buffer ABC may include a new message buffer which is different from Message Buffer AB. Lastly, as shown in Table 1, the UE 115-c may maintain Message Buffers ABCA and A upon performing a cell change procedure from the third cell 405-c (Cell C) to the first cell 405-a (Cell A), where Message Buffer ABCA may be configured to store PWS segments received via Cells A, B, C, and again in A, and Message Buffer A may be configured to store PWS segments received via Cell A. In some implementations, the UE 115-c may be configured to convert Message Buffer ABC to Message Buffer ABCA upon performing a cell change procedure to Cell A. Additionally, or alternatively, Message Buffer ABCA may include a new message buffer which is different from Message Buffer ABC.

In this regard, and in accordance with the first implementation, the UE 115-c may be configured to sequentially perform cell change procedures to the respective target cells 405 included within the geographical scope of PWS information, and acquire PWS segments from each of the respective target cells 405. Upon receiving PWS segments from each of the target cells 405, the UE 115-c may be configured to store received PWS segments in respective message buffers that are each associated with the most recent target cell 405. Moreover, the UE 115-c may be configured to store received PWS segments within additional message buffers that are each associated with the most recent target cell 405 as well as respective sets of the target cells 405 to which the UE 115-c was changed over to prior to being changed over to the most recent target cell 405. In other words, upon being handed over to Cell C, the UE 115-c may store PWS segments received via Cell C within a message buffer for the most recent target cell 405-c (e.g., Message Buffer C) as well as a message buffer including the most recent target cell 405-c and each target cell 405 that the UE 115-c was coupled to prior to the most recent target cell 405-c (e.g., Message Buffer ABC).

By way of another example, in a second implementation, the UE 115-c may maintain multiple message buffers as the UE 115-c moves between the target cells 405 of the wireless communications system 400 in accordance with Table 2 below:

TABLE 2

Multi-Message Buffer Handling (Implementation 2)

| Hop (Source Cell->Target Cell) | Message Buffers Maintained at UE |
|---|---|
| A->B | Message Buffers AB and B |
| B->C | Message Buffers BC and C (Discard Buffer AB) |
| C->A | Message Buffers CA and A (Discard Buffer BC) |

As shown in Table 2, in accordance with a second implementation, the UE 115-c may maintain Message Buffers AB and B upon performing a cell change procedure (e.g., handover procedure) from the first cell 405-a (Cell A) to the second cell 405-b (Cell B). Moreover, the UE 115-c may maintain Message Buffers BC and C upon performing a cell change procedure from the second cell 405-b (Cell B) to the third cell 405-c (Cell C), and may discard Message Buffer AB. Lastly, the UE 115-c may maintain Message Buffers CA and A upon performing a cell change procedure from the third cell 405-c (Cell C) to the first cell 405-a (Cell A), and may discard Message Buffer BC.

In this regard, and in accordance with the first implementation, the UE 115-c may be configured to sequentially perform cell change procedures to the respective target cells 405 included within the geographical scope of PWS information, and acquire PWS segments from each of the respective target cells 405. Upon receiving PWS segments from each of the target cells 405, the UE 115-c may be configured to store received PWS segments in respective message buffers that are each associated with the most recent target cell 405. Moreover, the UE 115-c may be configured to store received PWS segments within additional message buffers that are each associated with the most recent target cell 405 as well as a sequentially preceding target cell 405 to which the UE 115-c was changed over to prior to being changed over to the most recent target cell 405. In other words, upon being handed over to Cell C, the UE 115-c may store PWS segments received via Cell C within a message buffer for the most recent target cell 405-c (e.g., Message Buffer C) as well as a message buffer including the most recent target cell 405-c and the sequentially preceding target cell 405-b that the UE 115-c was coupled to prior to the most recent target cell 405-c (e.g., Message Buffer BC).

By way of another example, in a third implementation, the UE 115-c may maintain multiple message buffers as the UE 115-c moves between the target cells 405 of the wireless communications system 400 in accordance with Table 3 below:

TABLE 3

Multi-Message Buffer Handling (Implementation 3)

| Hop (Source Cell->Target Cell) | Message Buffers Maintained at UE | Buffer Depth |
|---|---|---|
| A->B | Message Buffers AB and B | 1 |
| B->C | Message Buffers ABC, BC, and C | 2 |
| C->A | Message Buffers ABCA, BCA, CA, and A | 3 |

As shown in Table 1, in accordance with a first implementation, the UE 115-c may maintain Message Buffers AB and B upon performing a cell change procedure (e.g., handover procedure) from the first cell 405-a (Cell A) to the second cell 405-b (Cell B). The UE 115-c may maintain Message Buffers ABC, BC, and C upon performing a cell change procedure from the second cell 405-b (Cell B) to the third cell 405-c (Cell C), and may maintain Message Buffers ABCA, BCA, CA, and A upon performing a cell change procedure from the third cell 405-c (Cell C) to the first cell 405-a (Cell A). In some cases, the UE 115—may be configured to convert or copy previous message buffers and/or generate new message buffers upon hopping to a new target cell 405.

The third implementation for maintaining multiple message buffers at the UE 115-c illustrated in Table 3 may be a combination or hybrid of the first and second implementations illustrated in Tables 1 and 2, respectively. By comparing Table 1 and Table 3, when performing the third implementation, the UE 115-c may maintain each of the message buffers which are maintained in the first implementation plus additional message buffers (e.g., Message Buffers BC, BCA, CA). In some aspects, the third implementation may be performed by defining a depth (e.g., quantity) of message buffers that are maintained at the UE 115-c. The message buffer depth, which may be defined by "X," may indicate a quantity of message buffers maintained at the UE 115-c, where X>2.

In some aspects, the UE 115-c may be configured to discard message buffers when a quantity of message buffers maintained at the UE 115-c (e.g., X) satisfies some depth threshold. For example, in cases where the depth threshold is set to four, the UE 115-c may begin discarding message buffers when the depth is greater than or equal to the depth threshold (e.g., discard if X>4). In particular, when the depth satisfies the depth threshold, the UE 115-c may discard (e.g., clear) the oldest message buffer. Additionally, or alternatively, if the depth is greater than two (X>2), and if the length of the oldest message buffer is greater than a length of the second oldest message buffer, the UE 115-c may be configured to discard the second oldest message buffer, as the oldest message buffer likely contains the most information (e.g., most PWS segments) and the second oldest may have the probability of least corruption (or else the UE 115-c may instead discard the oldest message buffer).

In other words, when performing the third implementation, the UE 115-c may be configured to store received PWS segments in accordance with the first implementation illustrated in Table 1, and may additionally store received PWS segments within additional message buffers that are each associated with a different set of two or more target cells 405 to which the UE 115-c was changed over prior to being changed over to the most recent target cell 405. Moreover, the UE 115-c may be configured to discard one or more message buffers based on a quantity of message buffers at the UE 115-c (e.g., depth X) satisfying a depth threshold.

Figure 5:
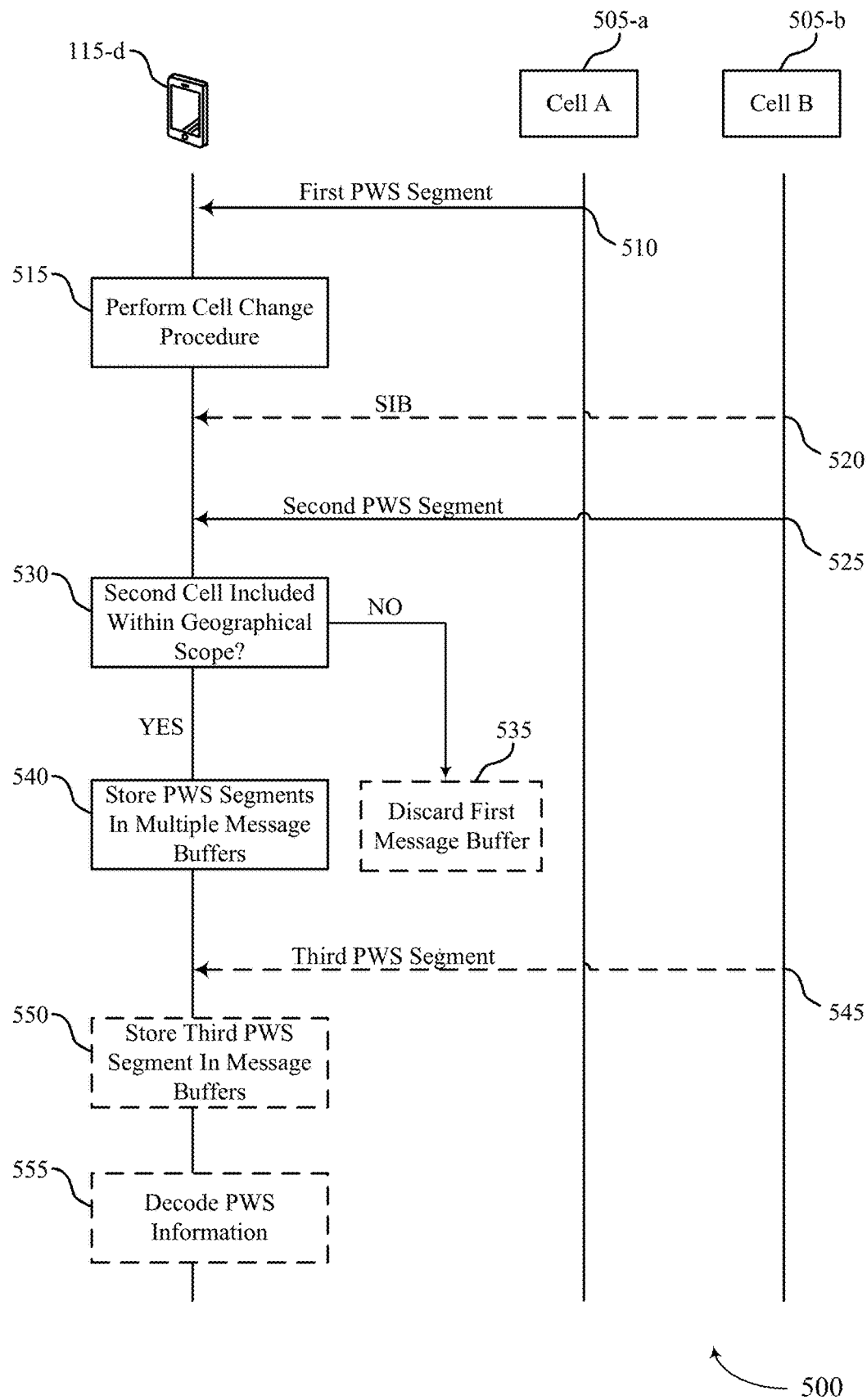
FIG. 5 illustrates an example of a process flow that supports techniques for handling PWS information using multiple message buffers in accordance with aspects of the present disclosure.

FIG. 5 illustrates an example of a process flow 500 that supports techniques for handling PWS information using multiple message buffers in accordance with aspects of the present disclosure In some examples, process flow 500 may implement, or be implemented by, aspects of wireless communications system 100, wireless communications system 200, wireless communications system 300, wireless communications system 400, or any combination thereof. For example, the process flow 500 may illustrate a UE 115-d receiving PWS segments via multiple cells 505, determining whether the cells 505 are included within a common geographical scope for PWS information, and storing the received PWS information within multiple message buffers maintained at the UE 115-*d*, as described with reference to FIGS. 1-4.

In some cases, process flow 500 may include a UE 115-*d*, a first cell 505-*a*, and a second cell 505-*b*, which may be examples of corresponding devices as described herein. For example, the UE 115-*d* illustrated in FIG. 5 may be an example of the UE 115-*b* and/or UE 115-*c* illustrated in FIG. 2 and FIG. 3, respectively. Similarly, the first cell 505-*a* and the second cell 505-*b* illustrated in FIG. 5 may be an example of the first cell 305-*a* and the second cell 305-*b* illustrated in FIG. 3 and/or the first cell 405-*a* and the second cell 405-*b* illustrated in FIG. 4. In some aspects, the first cell 505-*a* and the second cell 505-*b* may be supported by a single base station 105 of a wireless communications system. Additionally, or alternatively, the first cell 505-*a* and the second cell 505-*b* may be supported by different base stations 105.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 510, the UE 115-*d* may receive a first segment (e.g., PWS segment) of PWS information via the first cell 505-*a*. In some aspects, the PWS information may be associated with a geographical scope that includes the first cell 505-*a*. The geographical scope may include one or more cells 505 (e.g., set of cells 505), a PLMN, a tracking area, or any combination thereof. As will be described in further detail herein, the second cell 505-*b* may or may not be included within the geographical scope of the PWS information.

At 515, the UE 115-*d* may perform a cell change procedure from the first cell 505-*a* to the second cell 505-*b*. For example, the UE 115-*d* may perform a handover procedure or a cell reselection procedure. By way of another example, the UE 115-*d* may artificially bias measurements in order to trigger cell reselection from the first cell 505-*a* to the second cell 505-*b*. In some cases, as described previously herein, the UE 115-*d* may prioritize cells 505 which are included within the geographical scope of the PWS information.

At 520, the UE 115-*d* may receive a SIB (e.g., SIB1) via the second cell 505-*b*. The UE 115-*d* may receive the SIB at 520 based on performing the cell change procedure at 515. In some implementations, the SIB may include PWS scheduling information associated with the second cell 505-*d*. For example, the SIB may indicate whether or not the second cell 505-*b* is currently transmitting/broadcasting PWS information, and may indicate time and frequency resources on which the PWS information is transmitted.

At 525, the UE 115-*d* may receive a second segment of PWS information via the second cell 505-*b*. For example, the UE 115-*d* may receive the second segment based on (e.g., in accordance with) the PWS scheduling information received via the SIB at 520. The second segment may be associated with the same PWS information as the first cell 505-*a* and/or different PWS information.

At 530, the UE 115-*d* may determine whether the second cell 505-*b* is included within the geographical scope of the PWS information. In other words, the UE 115-*d* may determine whether the first segment of PWS information received via the first cell 505-*a* is valid/applicable for the second cell 505-*b*, and whether the second segment received via the second cell 505-*b* is associated with the same PWS information. In some aspects, the UE 115-*d* may determine whether the second cell 505-*b* is included within the geographical scope of the PWS information based on a serial identifier (serial-id) included within the second segment.

In cases where the UE 115-*d* determines that the second cell 505-*b* is not included within the geographical scope of the PWS information (e.g., step 530=NO), the process flow 500 may proceed to 535.

At 535, the UE 115-*d* may discard PWS segments received via the first cell 505-*a*. For example, as described previously herein, the UE 115-*d* may discard a first message buffer associated with at least the first cell 505-*a* (e.g., Message Buffer AB). In particular, upon determining that the second cell 505-*b* is not included within the geographical scope, the UE 115-*d* may determine that PWS segments received via the first cell 505-*a* are not valid or applicable for the second cell 505-*b*, and may thereby discard PWS segments received via the first cell 505-*a* and/or message buffers associated with the first cell 505-*a*.

In addition to discarding the message buffers and/or PWS segments associated with the first cell 505-*a* based on geographical scope not matching, the UE 115-*d* may be configured to discard message buffers and/or PWS segments associated with the first cell 505-*a* when other conditions are met. For example, the UE 115-*d* may be configured to discard a message buffer associated with the first cell 505-*a* (e.g., Message Buffer AB) when certain conditions are met including, but not limited to: all segments have been received (e.g., PWS information is built, complete segment is built); length mismatch between segments received via the first cell 505-*a* and the second cell 505-*b*; different sequentially last segments received via the first cell 505-*a* and the second cell 505-*b*; different serial identifiers within segments received via the first cell 505-*a* and the second cell 505-*b*; different message identifiers within segments received via the first cell 505-*a* and the second cell 505-*b*; the geographical scope changes; the serial identifier changes; the message identifier changes; a timer expires (e.g., expiration of 3-hour timer).

In cases where the UE 115-*d* determines that the second cell 505-*b* is included within the geographical scope of the PWS information (e.g., step 530=YES), the process flow 500 may proceed to 540.

At 540, the UE 115-*b* may store the received PWS segments within multiple message buffers which are maintained at the UE 115-*d*. In particular, the UE 115-*d* may store the received segments within the multiple message buffers based on determining that the second cell 505-*b* is included within the geographical scope of the PWS information at 530. For example, the UE 115-*a* may be configured to store the first segment received via the first cell 505-*a* in a first message buffer configured to aggregate segments received via both the first cell 505-*a* and the second cell 505-*b* (e.g., Message Buffer AB), and may be configured to store the second segment received via the second cell 505-*b* in a second message buffer configured to aggregate segments received via only the second cell 505-*b* (e.g., Message Buffer B). In this example, the second segment may be stored in both the first and second message buffers.

At 545, the UE 115-*d* may receive a third segment of the PWS information via the second cell 505-*b*. The UE 115-*d* may receive the third segment based on (e.g., in accordance with) PWS scheduling information indicated via the SIB which was received at 520.

At 550, the UE 115-d may store the third segment of the PWS information in at least one of the multiple message buffers that are maintained at the UE 115-d. For example, continuing with the example above, the UE 115-d may store the third segment within the first message buffer configured to aggregate segments received via both the first cell 505-a and the second cell 505-b (e.g., Message Buffer AB), and may be configured to store the second segment received via the second cell 505-b in a second message buffer configured to aggregate segments received via only the second cell 505-b (e.g., Message Buffer B). In this example, the third segment (and other segments received via the second cell 505-b) may be stored in both the first and second message buffers.

At 555, the UE 115-d may decode the PWS information. For example, the UE 115-d may identify that the first message buffer and/or the second message buffer is complete in that the respective message buffer includes each segment of the full PWS information. In this example, the UE 115-d may decode the completed message buffer. For instance, the UE 115-d may send the completed message buffer to a higher layer at the UE 115-d for processing and decoding.

Figure 6:
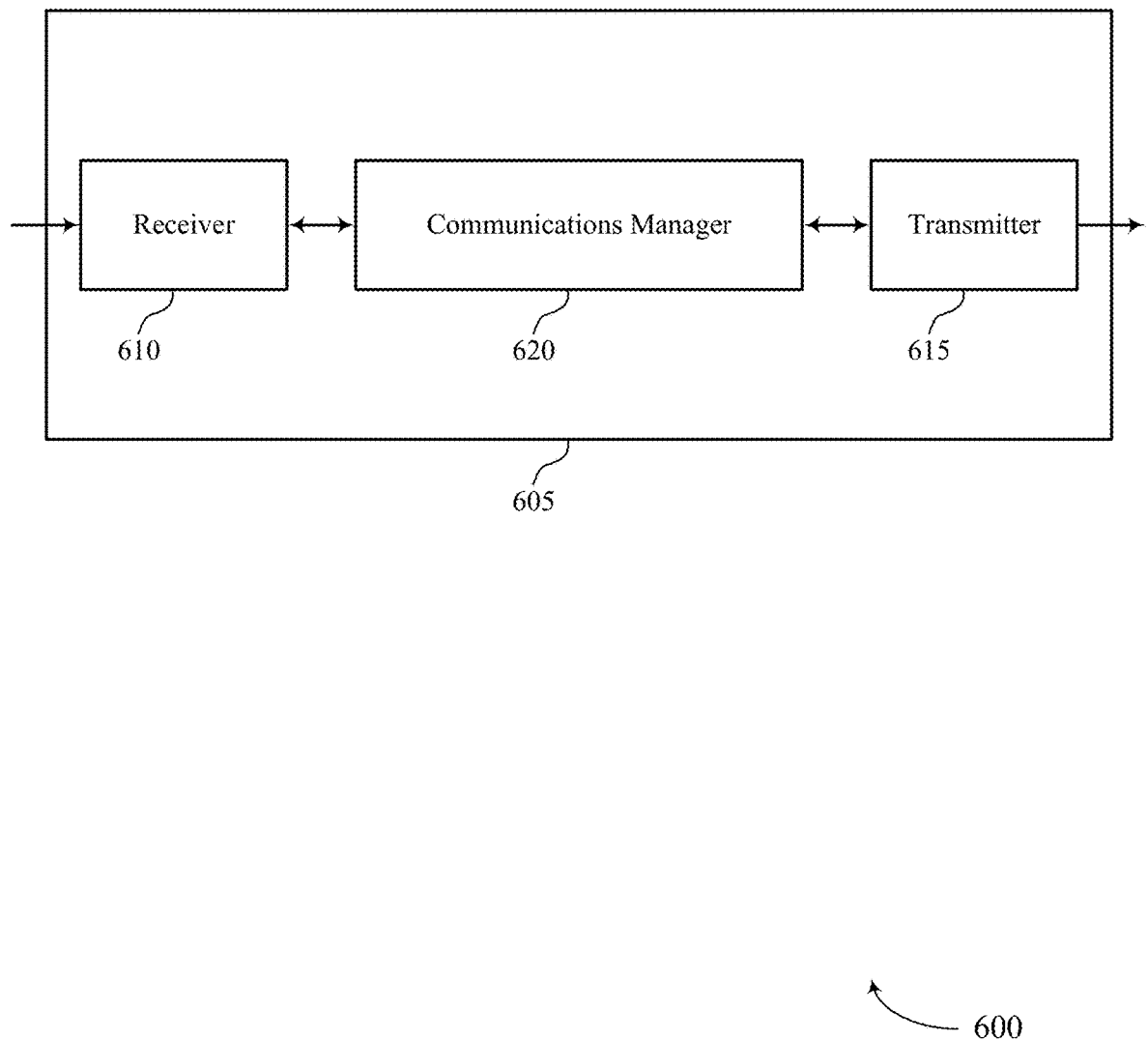
FIGS. 6 and 7 show block diagrams of devices that support techniques for handling PWS information using multiple message buffers in accordance with aspects of the present disclosure.

FIG. 6 shows a block diagram 600 of a device 605 that supports techniques for handling PWS information using multiple message buffers in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for handling PWS information using multiple message buffers). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for handling PWS information using multiple message buffers). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for handling PWS information using multiple message buffers as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving a first segment of PWS information via a first cell, where the PWS information is associated with a geographical scope that includes the first cell. The communications manager 620 may be configured as or otherwise support a means for performing a cell change procedure from the first cell to a second cell different from the first cell. The communications manager 620 may be configured as or otherwise support a means for receiving a second segment of the PWS information via the second cell. The communications manager 620 may be configured as or otherwise support a means for storing the first segment and the second segment within multiple message buffers based on the second cell being included within the geographical scope associated with the PWS information.

By including or configuring the communications manager 620 in accordance with examples as described herein, the device 605 (e.g., a processor controlling or otherwise coupled to the receiver 610, the transmitter 615, the communications manager 620, or a combination thereof) may support techniques which enable the UE 115-a to maintain multiple "message buffers" for storing received PWS segments. The use of multiple message buffers may improve the reception and storage of PWS segments as the UE moves from cell to cell, and may reduce a time it takes to successfully receive and decode PWS information.

Figure 7:
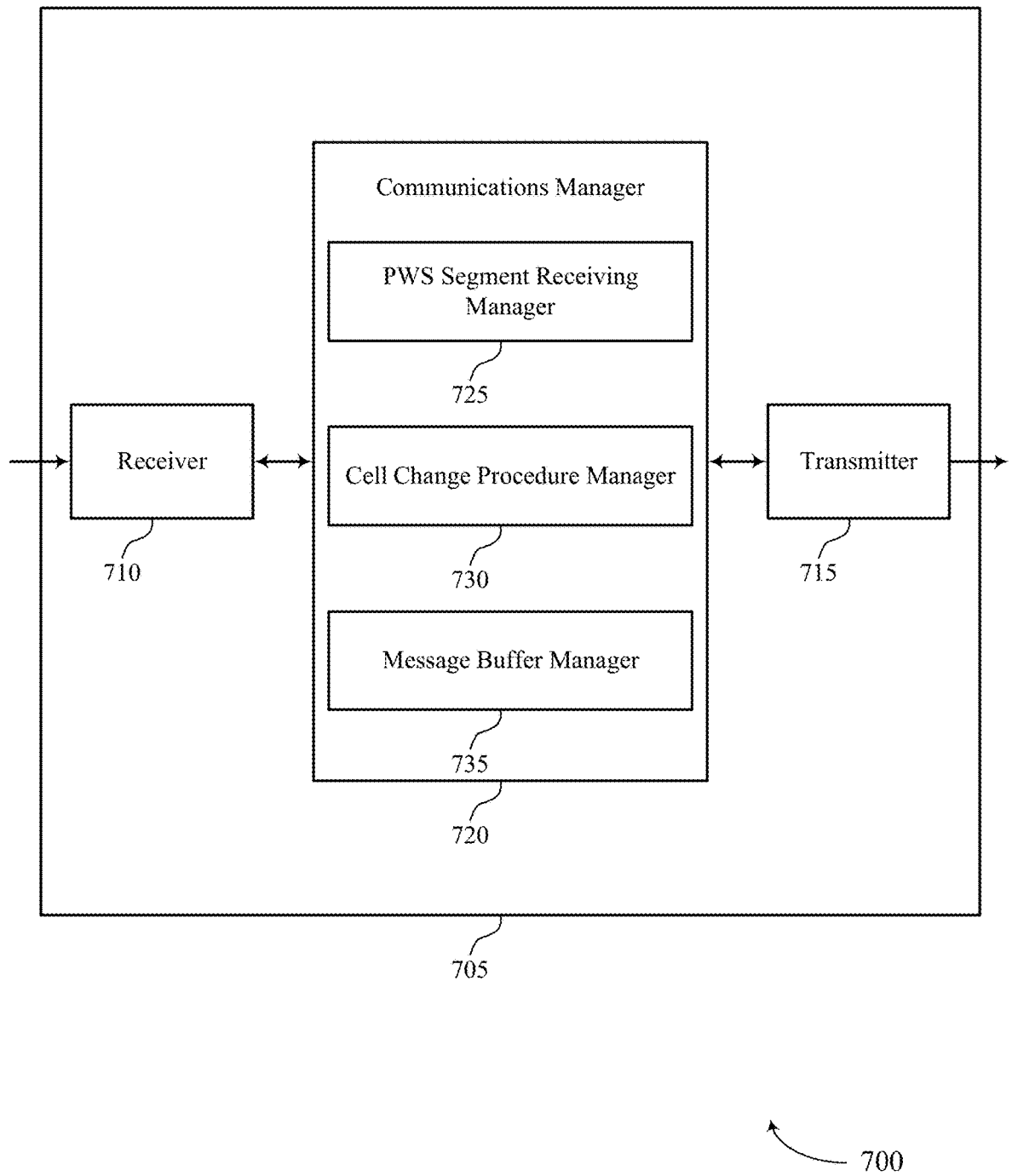

FIG. 7 shows a block diagram 700 of a device 705 that supports techniques for handling PWS information using multiple message buffers in accordance with aspects of the present disclosure. The device 705 may be an example of aspects of a device 1205 or a UE 115 as described herein.

The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for handling PWS information using multiple message buffers). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for handling PWS information using multiple message buffers). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for handling PWS information using multiple message buffers as described herein. For example, the communications manager 720 may include a PWS segment receiving manager 725, a cell change procedure manager 730, a message buffer manager 735, or any combination thereof. The communications manager 720 may be an example of aspects of a communications manager 1220 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The PWS segment receiving manager 725 may be configured as or otherwise support a means for receiving a first segment of PWS information via a first cell, where the PWS information is associated with a geographical scope that includes the first cell. The cell change procedure manager 730 may be configured as or otherwise support a means for performing a cell change procedure from the first cell to a second cell different from the first cell. The PWS segment receiving manager 725 may be configured as or otherwise support a means for receiving a second segment of the PWS information via the second cell. The message buffer manager 735 may be configured as or otherwise support a means for storing the first segment and the second segment within multiple message buffers based on the second cell being included within the geographical scope associated with the PWS information.

Figure 8:
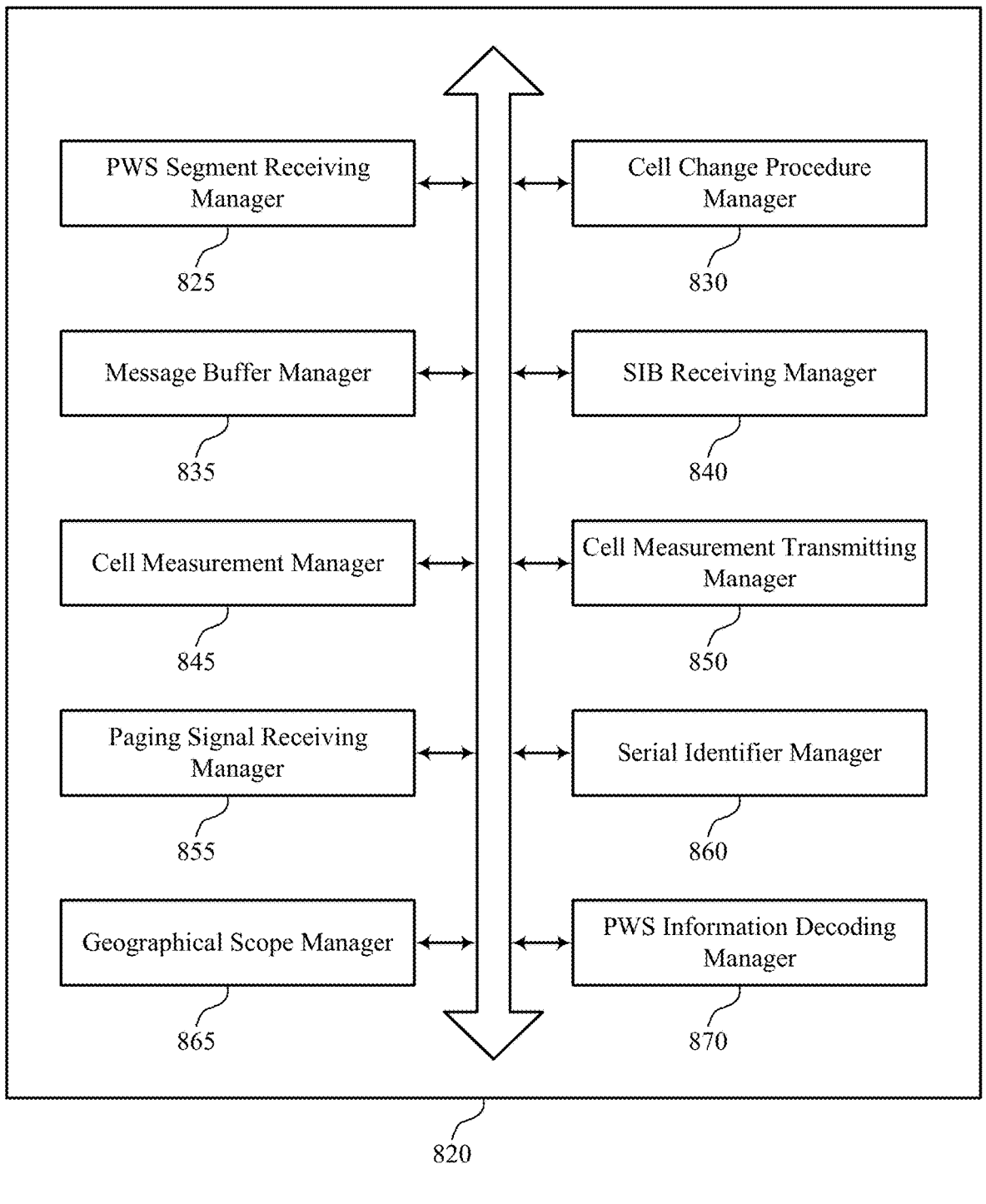
FIG. 8 shows a block diagram of a communication manager that supports techniques for handling PWS information using multiple message buffers in accordance with aspects of the present disclosure.

FIG. 8 shows a block diagram 800 of a communications manager 820 that supports techniques for handling PWS information using multiple message buffers in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for handling PWS information using multiple message buffers as described herein. For example, the communications manager 820 may include a PWS segment receiving manager 825, a cell change procedure manager 830, a message buffer manager 835, an SIB receiving manager 840, a cell measurement manager 845, a cell measurement transmitting manager 850, a paging signal receiving manager 855, a serial identifier manager 860, a geographical scope manager 865, a PWS information decoding manager 870, or any combination thereof. Each of these components may communicate, directly or indirectly, with one another (e.g., via one or more buses).

The communications manager 820 may support wireless communication at a UE in accordance with examples as disclosed herein. The PWS segment receiving manager 825 may be configured as or otherwise support a means for receiving a first segment of PWS information via a first cell, where the PWS information is associated with a geographical scope that includes the first cell. The cell change procedure manager 830 may be configured as or otherwise support a means for performing a cell change procedure from the first cell to a second cell different from the first cell. In some examples, the PWS segment receiving manager 825 may be configured as or otherwise support a means for receiving a second segment of the PWS information via the second cell. The message buffer manager 835 may be configured as or otherwise support a means for storing the first segment and the second segment within multiple message buffers based on the second cell being included within the geographical scope associated with the PWS information.

In some examples, to support storing the first segment and the second segment, the message buffer manager 835 may be configured as or otherwise support a means for storing the first segment in a first message buffer associated with the first cell and the second cell based on the second cell being included within the geographical scope associated with the PWS information. In some examples, to support storing the first segment and the second segment, the message buffer manager 835 may be configured as or otherwise support a means for storing the second segment in the first message buffer a second message buffer associated with the second cell based on the second cell being included within the geographical scope associated with the PWS information, the second message buffer different from the first message buffer.

In some examples, the PWS segment receiving manager 825 may be configured as or otherwise support a means for receiving a third segment of the PWS information via the second cell. In some examples, the message buffer manager 835 may be configured as or otherwise support a means for storing the third segment in the first message buffer and the second message buffer.

In some examples, the serial identifier manager 860 may be configured as or otherwise support a means for receiving a serial identifier associated with the second segment. In some examples, the geographical scope manager 865 may be configured as or otherwise support a means for identifying that the second cell is included within the geographical scope associated with the PWS information is based on the serial identifier associated with the second segment.

In some examples, the message buffer manager 835 may be configured as or otherwise support a means for storing the first segment in the first message buffer, storing the second segment in the second message buffer, or both, based on a first serial identifier associated with the first segment matching a second serial identifier associated with the second segment and a first message identifier associated with the first segment matching a second message identifier associated with the second segment. In some examples, the message buffer manager 835 may be configured as or otherwise support a means for discarding the first message buffer based on a first segmentation configuration associated with at least one segment stored in the first message buffer being different from a second segmentation configuration associated with at least one additional segment stored in the second message buffer. In some examples, the message buffer manager 835 may be configured as or otherwise support a means for discarding the first message buffer based on the first segment and the second segment corresponding to a same PWS segment of the PWS information and a first length of the first segment being different from a second length of the second segment.

In some examples, the message buffer manager 835 may be configured as or otherwise support a means for discarding the first message buffer based on a sequentially last segment stored in the first message buffer being different from a sequentially last segment stored in the second message buffer. In some examples, the message buffer manager 835 may be configured as or otherwise support a means for discarding the first message buffer based on a first concatenation configuration associated with the first message buffer being different from a second concatenation configuration associated with the second message buffer. In some examples, the message buffer manager 835 may be configured as or otherwise support a means for discarding the first message buffer based on a first message identifier or a first serial identifier associated with the first segment being different from a second message identifier or a second serial identifier, respectively, associated at least one segment stored in the second message buffer. In some examples, the message buffer manager 835 may be configured as or otherwise support a means for discarding the first message buffer based on an expiration of a timer associated with the first segment, the PWS information, or both.

In some examples, the PWS information decoding manager 870 may be configured as or otherwise support a means for decoding the PWS information based on the first message buffer being completed, the second message buffer being completed, or both.

In some examples, the cell change procedure manager 830 may be configured as or otherwise support a means for performing, sequentially, one or more additional cell change procedures to additional target cells, with a first additional cell change procedure being from the second cell to a first additional target cell, the additional target cells included within the geographical scope associated with the PWS information. In some examples, the PWS segment receiving manager 825 may be configured as or otherwise support a means for receiving, in connection with each additional cell change procedure and via respective additional target cells, respective additional segments of the PWS information. In some examples, the message buffer manager 835 may be configured as or otherwise support a means for storing each of the respective additional segments in respective first additional message buffers that are each associated with one of the additional target cells corresponding to the respective additional segments. In some examples, the message buffer manager 835 may be configured as or otherwise support a means for storing each of the respective additional segments in second additional message buffers that are each associated with the one of the additional target cells and that are each also associated with the first cell, the second cell, and respective sets of the additional target cells to which the UE was changed over prior to being changed over to the one of the additional target cells.

In some examples, the message buffer manager 835 may be configured as or otherwise support a means for storing each of the respective additional segments in third additional message buffers that are each associated with a different set of two or more target cells to which the UE was changed over prior to being changed over to the one of the additional target cells. In some examples, the message buffer manager 835 may be configured as or otherwise support a means for discarding one or more message buffers based on a quantity of message buffers at the UE satisfying a depth threshold. In some examples, discarding one or more message buffers includes discarding an oldest message buffer at the UE, a second-oldest message buffer at the UE, or both.

In some examples, the cell change procedure manager 830 may be configured as or otherwise support a means for performing, sequentially, one or more additional cell change procedures to additional target cells, with a first additional cell change procedure being from the second cell to a first additional target cell, the additional target cells included within the geographical scope associated with the PWS information. In some examples, the PWS segment receiving manager 825 may be configured as or otherwise support a means for receiving, in connection with each additional cell change procedure and via respective additional target cells, respective additional segments of the PWS information. In some examples, the message buffer manager 835 may be configured as or otherwise support a means for storing each of the respective additional segments in respective first additional message buffers that are each associated with one of the additional target cells corresponding to the respective additional segments. In some examples, the message buffer manager 835 may be configured as or otherwise support a means for storing each of the respective additional segments in second additional message buffers that are each associated with the one of the additional target cells and that are each also associated with a sequentially preceding target cell to which the UE was changed over to prior to being changed over to the one of the additional target cells.

In some examples, the message buffer manager 835 may be configured as or otherwise support a means for discarding a sequentially preceding second additional message buffer associated with target cells to which the UE was handed over prior to being changed over to the one of the additional target cells.

In some examples, the SIB receiving manager 840 may be configured as or otherwise support a means for receiving, via the second cell and based on performing the cell change procedure, a SIB including PWS scheduling information associated with the second cell, where the second segment of the PWS information is received in accordance with the PWS scheduling information.

In some examples, the geographical scope includes a set of one or more cells, a public land mobile network, a tracking area, or any combination thereof.

In some examples, the cell measurement manager 845 may be configured as or otherwise support a means for biasing a cell measurement associated with the first cell or a cell measurement associated with the second cell. In some examples, the cell measurement transmitting manager 850 may be configured as or otherwise support a means for transmitting, to a base station, the biased cell measurement associated with the first cell or the biased cell measurement associated with the second cell, where performing the cell change procedure is based on transmitting the biased cell measurement associated with the first cell or the biased cell measurement associated with the second cell.

In some examples, the PWS information is associated with the geographical scope that includes the first cell and the second cell. In some examples, the UE biases the cell measurement associated with the first cell or the cell measurement associated with the second cell based on the second cell being associated with the geographical scope of the PWS information.

In some examples, to support performing the cell change procedure, the cell change procedure manager 830 may be configured as or otherwise support a means for initiating a reselection to the second cell based on the second cell being associated with the geographical scope of the PWS information.

In some examples, the paging signal receiving manager 855 may be configured as or otherwise support a means for receiving a paging signal including an indication of the presence of the PWS information, where receiving the first segment is based on receiving the paging signal.

In some examples, the SIB receiving manager 840 may be configured as or otherwise support a means for receiving a SIB including an indication of the presence of the PWS information, where receiving the first segment is based on receiving the SIB.

Figure 9:
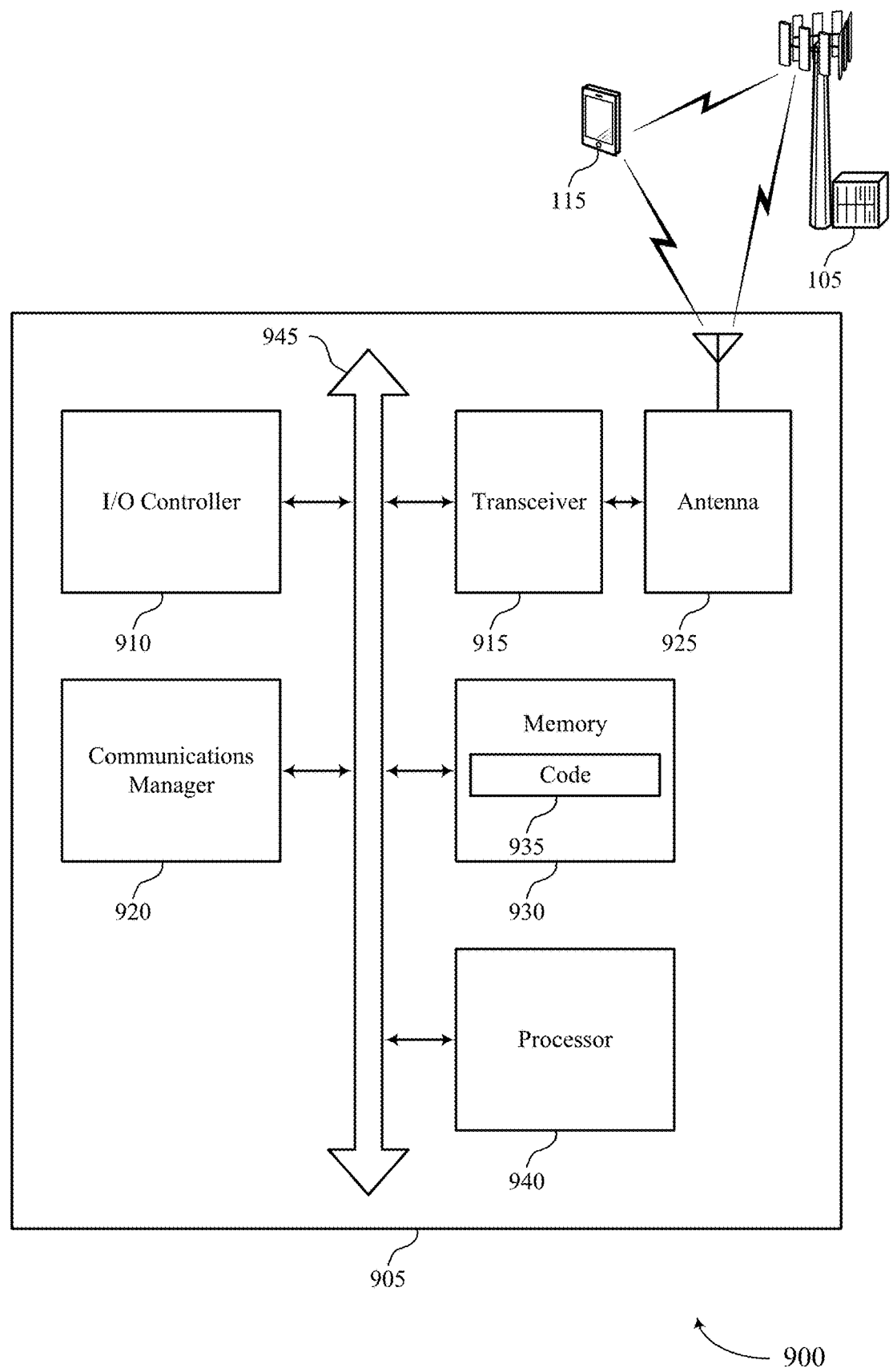
FIG. 9 shows a diagram of a system including a device that supports techniques for handling PWS information using multiple message buffers in accordance with aspects of the present disclosure.

FIG. 9 shows a diagram of a system 900 including a device 905 that supports techniques for handling PWS information using multiple message buffers in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 10, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for handling PWS information using multiple message buffers). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first segment of PWS information via a first cell, where the PWS information is associated with a geographical scope that includes the first cell. The communications manager 920 may be configured as or otherwise support a means for performing a cell change procedure from the first cell to a second cell different from the first cell. The communications manager 920 may be configured as or otherwise support a means for receiving a second segment of the PWS information via the second cell. The communications manager 920 may be configured as or otherwise support a means for storing the first segment and the second segment within multiple message buffers based on the second cell being included within the geographical scope associated with the PWS information.

By including or configuring the communications manager 920 in accordance with examples as described herein, the device 905 may support techniques for which enable the UE 115-a to maintain multiple "message buffers" for storing received PWS segments. The use of multiple message buffers may improve the reception and storage of PWS segments as the UE moves from cell to cell, and may reduce a time it takes to successfully receive and decode PWS information.

Figure 10:
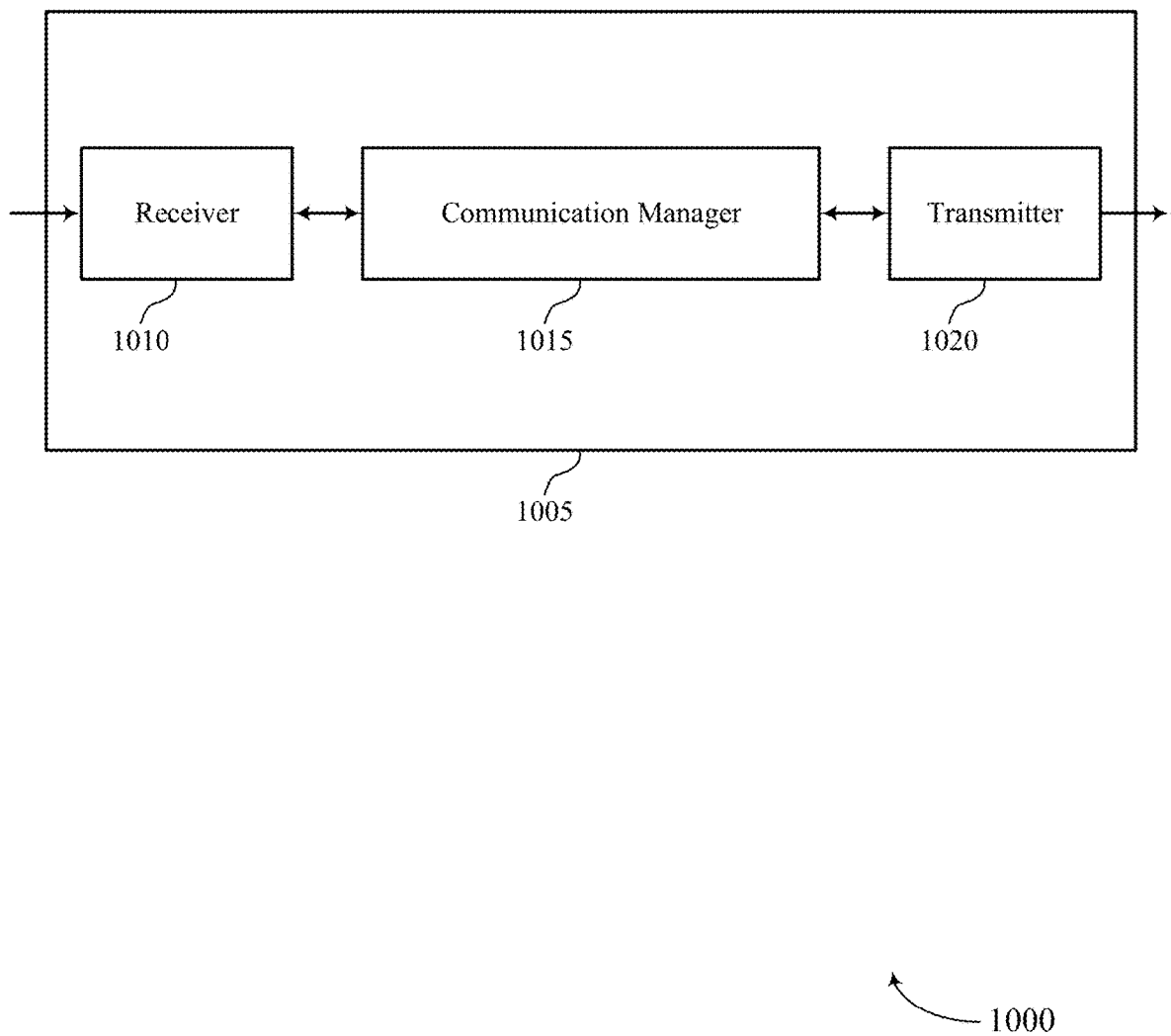
FIGS. 10 and 11 show block diagrams of devices that support error handling for PWS information in accordance with aspects of the present disclosure.

FIG. 10 shows a block diagram 1000 of a device 1005 that supports techniques for handling PWS information using multiple message buffers in accordance with aspects of the present disclosure. The device 1005 may be an example of aspects of a UE 115 as described herein. The device 1005 may include a receiver 1010, a communication manager 1015, and a transmitter 1020. The device 1005 may also include a processor. Each of these components may be in communication with one another (e.g., via one or more buses).

The receiver 1010 may provide a means for receiving information such as packets, user data, or control information associated with various information channels (e.g., control channels, data channels, information related to error handling for PWS information). Information may be passed on to other components of the device 1005. The receiver 1010 may utilize a single antenna or a plurality of antennas.

The transmitter 1020 may provide a means for transmitting signals generated by other components of the device 1005. In some examples, the transmitter 1020 may be co-located with a receiver 1010 in a transceiver module. The transmitter 1020 may utilize a single antenna or a plurality of antennas.

The communication manager 1015, the receiver 1010, or the transmitter 1020, or various combinations thereof or components thereof, may be an example of a means for performing various aspects of error handling for PWS information as described herein. The communication manager 1015, or its sub-components, may be implemented in hardware (e.g., in communications management circuitry), software (e.g., executed by a processor), or any combination thereof. If implemented in code executed by a processor, the functions of the communication manager 1015, or its sub-components, may be executed by a general-purpose processor, a DSP, a CPU, an ASIC, an FPGA or other programmable logic device, discrete gate or transistor logic, discrete hardware components, or any combination thereof designed to perform the functions described in the present disclosure. In some examples, the communication manager 1015 may be configured to perform various operations (e.g., receiving, monitoring, transmitting) using or otherwise in cooperation with the receiver 1010, the transmitter 1020, or both.

The communication manager 1015 may support wireless communication at a user equipment in accordance with examples as disclosed herein. For example, the communication manager 1015 may be configured to provide or support a means for identifying a presence of PWS information. The communication manager 1015 may be configured to provide or support a means for determining an inability to receive the PWS information using a first communication resource. The communication manager 1015 may be configured to provide or support a means for initiating, based on determining the inability to receive the PWS information using the first communication resource, a transition from the first communication resource to a second communication resource. The communication manager 1015 may be configured to provide or support a means for monitoring for the PWS information using the second communication resource.

By including or configuring the communication manager 1015 in accordance with examples as described herein, the device 1005 may support improved techniques for error handling related to PWS information. For example, by initiating a transition to a new communication resource, the device 1005 may be able to receive PWS information more quickly or more efficiently (e.g., with less power consumption, with reduced monitoring or processing) than if the device 1005 attempted to receive the PWS information using a communication resource that may be associated with a poor radio link or misconfiguration, among other benefits.

Figure 11:
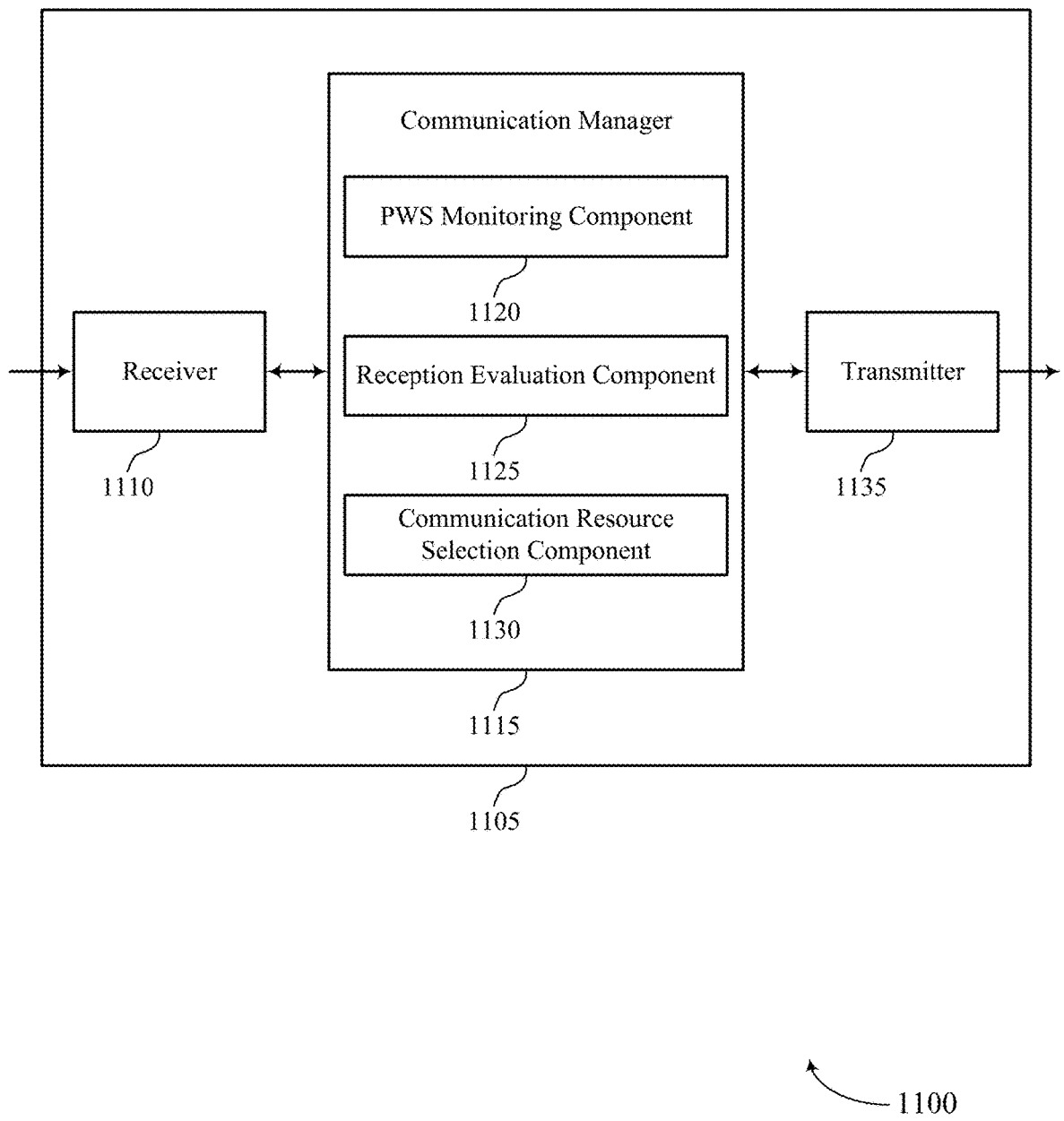

FIG. 11 shows a block diagram 1100 of a device 1105 that supports error handling for PWS information in accordance with aspects of the present disclosure. The device 1105 may be an example of aspects of a device 1005 or a UE 115 as described herein. The device 1105 may include a receiver 1110, a communication manager 1115, and a transmitter 1135. The device 1105 may also include a processor. Each of these components may be in communication with one another (e.g., via one or more buses).

The receiver 1110 may provide a means for receiving information such as packets, user data, or control information associated with various information channels (e.g., control channels, data channels, information related to error handling for PWS information). Information may be passed on to other components of the device 1105. The receiver 1110 may utilize a single antenna or a set of antennas.

The transmitter 1135 may provide a means for transmitting signals generated by other components of the device 1105. In some examples, the transmitter 1135 may be co-located with a receiver 1110 in a transceiver module. The transmitter 1135 may utilize a single antenna or a set of antennas.

The device 1105, or various components thereof, may be an example of means for performing various aspects of error handling for PWS information as described herein. For example, the communication manager 1115 may include a PWS monitoring component 1120, a reception evaluation component 1125, a communication resource selection component 1130, or any combination thereof. The communication manager 1115 may be an example of aspects of a communication manager 1015 as described herein. In some examples, the communication manager 1115, or various components thereof, may be configured to perform various operations (e.g., receiving, monitoring, transmitting) using or otherwise in cooperation with the receiver 1110, the transmitter 1135, or both.

The communication manager 1115 may support wireless communication at a UE in accordance with examples as disclosed herein. The PWS monitoring component 1120 may be configured to provide or support a means for identifying a presence of PWS information. The reception evaluation component 1125 may be configured to provide or support a means for determining an inability to receive the PWS information using a first communication resource. The communication resource selection component 1130 may be configured to provide or support a means for initiating, based on determining the inability to receive the PWS information using the first communication resource, a transition from the first communication resource to a second communication resource. The PWS monitoring component 1120 may be configured to provide or support a means for monitoring for the PWS information using the second communication resource.

Figure 12:
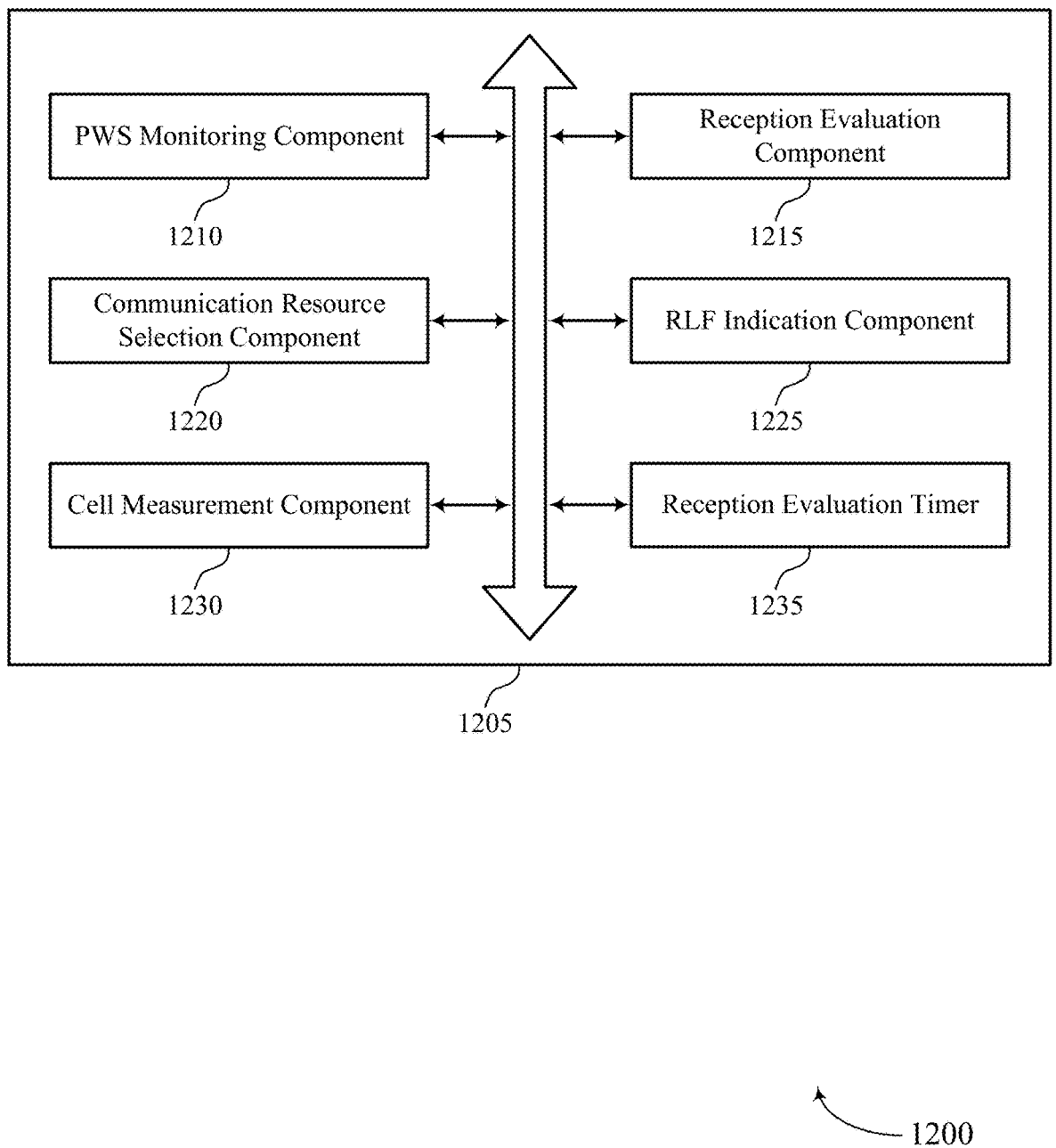
FIG. 12 shows a block diagram of a communication manager that supports error handling for PWS information in accordance with aspects of the present disclosure.

FIG. 12 shows a block diagram 1200 of a communication manager 1205 that supports error handling for PWS information in accordance with aspects of the present disclosure. The communication manager 1205 may be an example of aspects of a communication manager 1015, a communication manager 1115, or both, as described herein. The communication manager 1205, or various components thereof, may be an example of means for performing various aspects of error handling for PWS information as described herein. For example, the communication manager 1205 may include a PWS monitoring component 1210, a reception evaluation component 1215, a communication resource selection component 1220, an RLF indication component 1225, a cell measurement component 1230, a reception evaluation timer 1235, or any combination thereof. Each of these components may communicate, directly or indirectly, with one another (e.g., via one or more buses).

The communication manager 1205 may support wireless communication at a UE in accordance with examples as disclosed herein. The PWS monitoring component 1210 may be configured to provide or support a means for identifying a presence of PWS information. The reception evaluation component 1215 may be configured to provide or support a means for determining an inability to receive the PWS information using a first communication resource. The communication resource selection component 1220 may be configured to provide or support a means for initiating, based on determining the inability to receive the PWS information using the first communication resource, a transition from the first communication resource to a second communication resource. In some examples, the PWS monitoring component 1210 may be configured to provide or support a means for monitoring for the PWS information using the second communication resource.

In some examples, the first communication resource may include a first BWP of a radio frequency spectrum. In some examples, to initiate the transition from the first communication resource to the second communication resource, the communication resource selection component 1220 may be configured to provide or support a means for initiating a transition from communicating using the first BWP of the radio frequency spectrum to communicating using a second BWP of the radio frequency spectrum.

In some examples, the first communication resource may include a radio link with a base station. In some examples, to initiate the transition from the first communication resource to the second communication resource, the RLF indication component 1225 may be configured to provide or support a means for indicating a RLF to the base station.

In some examples, the first communication resource may include a communication link via a first cell. In some examples, to initiate the transition from the first communication resource to the second communication resource, the cell measurement component 1230 may be configured to provide or support a means for biasing a cell measurement associated with the first cell or a cell measurement associated with a second cell associated with the second communication resource. In some examples, to initiate the transition from the first communication resource to the second communication resource, the cell measurement component 1230 may be configured to provide or support a means for transmitting, to a base station, the biased cell measurement associated with the first cell or the biased cell measurement associated with the second cell.

In some examples, the first communication resource may include a communication link via a first cell. In some examples, to initiate the transition from the first communication resource to the second communication resource, the communication resource selection component 1220 may be configured to provide or support a means for releasing the communication link via the first cell.

In some examples, the first communication resource may include a communication link via a first cell. In some examples, to initiate the transition from the first communication resource to the second communication resource, the communication resource selection component 1220 may be configured to provide or support a means for initiating a reselection to a second cell associated with the second communication resource.

In some examples, to determine the inability to receive the PWS information using the first communication resource, the reception evaluation component 1215 may be configured to provide or support a means for determining an inability to decode a SIB.

In some examples, the reception evaluation component 1215 determining the inability to receive the PWS information using the first communication resource may be based on a duration after identifying the presence of the PWS information. In some examples, the duration may be associated with a segment of the PWS information (e.g., in an example of a segment-specific timer or a per-segment timer). In some examples, the duration may be based on whether one or more valid segments of the PWS information have been received (e.g., in an example of adjusting an overarching timer based on successful reception of one or more segments). In some examples, determining the inability to receive the PWS information using the first communication resource may include the reception evaluation component 1215 resetting a timer associated with the duration upon receipt of a valid segment of the PWS information. In some examples, the duration may be based on a periodicity of system information, a quantity of segments of the PWS information, a quantity of attempts per segment, or a combination thereof (e.g., in an example of an overarching timer). In some examples, the duration may be based at least in part on an identified interruption while attempting to receive the PWS information (e.g., according to an adjustment to an overarching timer or pausing of an overarching timer associated with an interruption timer). In some examples, the duration may be based on an RRC configuration associated with the first communication resource (e.g., an 8-hour SIB decoding or segment assembly timer).

In some examples, the PWS monitoring component 1210 may be configured to provide or support a means for receiving a paging signal and, to identify the presence of PWS information, the PWS monitoring component 1210 may be configured to provide or support a means for decoding an indication of the presence of the PWS information from the received paging signal.

In some examples, the PWS monitoring component 1210 may be configured to provide or support a means for receiving a SIB, and, to identify the presence of PWS information, the PWS monitoring component 1210 may be configured to provide or support a means for decoding an indication of the presence of the PWS information from the received SIB.

Figure 13:
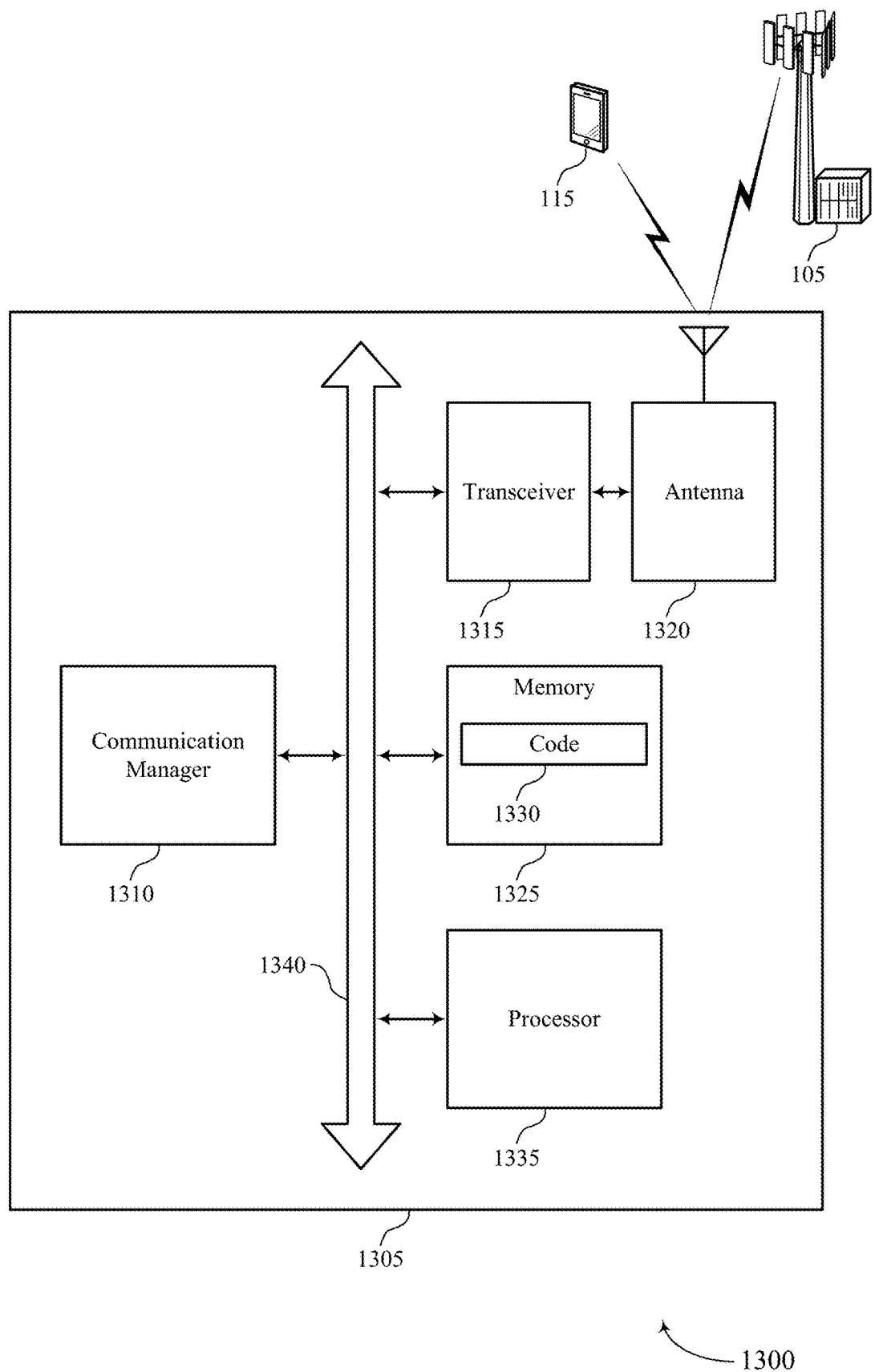
FIG. 13 shows a diagram of a system including a device that supports error handling for PWS information in accordance with aspects of the present disclosure.

FIG. 13 shows a diagram of a system 1300 including a device 1305 that supports error handling for PWS information in accordance with aspects of the present disclosure. The device 1305 may be an example of or include the components of device 1005, device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, including a communication manager 1310, a transceiver 1315, an antenna 1320, a memory 1325, and a processor 1335. These components may be in electronic communication or otherwise coupled (e.g., operatively, communicatively, functionally, electronically, electrically) via one or more buses (e.g., bus 1340).

In some cases, the device 1305 may include a single antenna 1320. However, in some cases the device may have more than one antenna 1320, which may be capable of concurrently transmitting or receiving multiple wireless transmissions. The transceiver 1315 may communicate bi-directionally, via the one or more antennas 1320, wired, or wireless links as described herein. For example, the transceiver 1315 may represent a wireless transceiver and may communicate bi-directionally with another wireless transceiver. The transceiver 1315 may also include a modem to modulate the packets and provide the modulated packets to the one or more antennas 1320 for transmission, and to demodulate packets received from the one or more antennas 1320. The transceiver 1315, or the transceiver 1315 and one or more antennas 1320, may be an example of a transmitter 1020, a transmitter 1135, a receiver 1010, a receiver 1110, or any combination thereof or component thereof, as described herein.

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or other type of memory. In some cases, the code 1330 may not be directly executable by the processor 1335 but may cause a computer (e.g., when compiled and executed) to perform functions described herein. In some cases, the memory 1325 may contain, among other things, a basic input/output system (BIOS) which may control basic hardware or software operation such as the interaction with peripheral components or devices.

The processor 1335 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting error handling for PWS information).

The communication manager 1310 may support wireless communication at a UE in accordance with examples as disclosed herein. For example, the communication manager 1310 may be configured to provide or support a means for identifying a presence of PWS information. The communication manager 1310 may be configured to provide or support a means for determining an inability to receive the PWS information using a first communication resource. The communication manager 1310 may be configured to provide or support a means for initiating, based on determining the inability to receive the PWS information using the first communication resource, a transition from the first communication resource to a second communication resource. The communication manager 1310 may be configured to provide or support a means for monitoring for the PWS information using the second communication resource.

By including or configuring the communication manager 1310 in accordance with examples as described herein, the device 1305 may support improved techniques for error handling related to PWS information. For example, by initiating a transition to a new communication resource, the device 1305 may be able to receive PWS information more quickly or more efficiently (e.g., with less power consumption, with reduced monitoring or processing) than if the device 1305 attempted to receive the PWS information using a communication resource that may be associated with a poor radio link or misconfiguration, among other benefits. In some examples, such benefits may be accompanied by an improved user experience associated with operation of the device 1305. For example, by employing techniques in accordance with examples as disclosed herein, a user may be alerted more quickly of events such as natural disasters, public safety alerts, evacuation alerts, or other warnings. Moreover, in some examples, a reduction in power consumption or processing requirements by the described techniques may support longer battery life, or improved utilization of processing or wireless communication resources.

In some examples, the communication manager 1310 may be configured to perform various operations (e.g., receiving, monitoring, transmitting) using or otherwise in cooperation with the transceiver 1315, the one or more antennas 1320, or any combination thereof. Although the communication manager 1310 is illustrated as a separate component, in some examples, one or more functions described with reference to the communication manager 1310 may be supported by or performed by the processor 1335, the memory 1325, the code 1330, or any combination thereof. For example, the code 1330 may include instructions executable by the processor 1335 to cause the device 1305 to perform various aspects of error handling for PWS information as described herein, or the processor 1335 and the memory 1325 may be otherwise configured to perform or support such operations.

Figure 14:
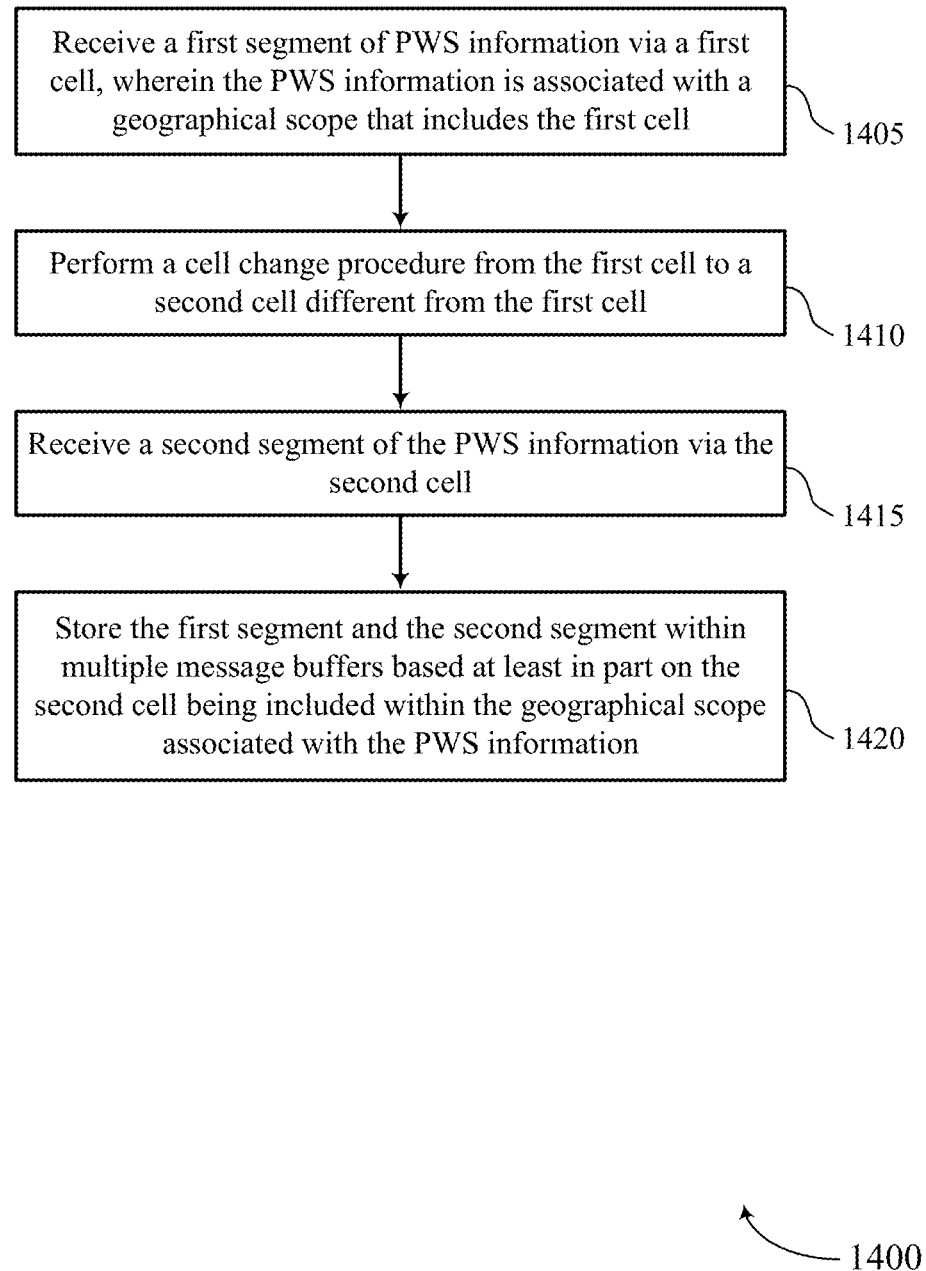
FIGS. 14 and 15 show flowcharts illustrating methods that support techniques for handling PWS information using multiple message buffers in accordance with aspects of the present disclosure.

FIG. 14 shows a flowchart illustrating a method 1400 that supports techniques for handling PWS information using multiple message buffers in accordance with aspects of the present disclosure. The operations of the method 1400 may be implemented by a UE or its components as described herein. For example, the operations of the method 1400 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1405, the method may include receiving a first segment of PWS information via a first cell, where the PWS information is associated with a geographical scope that includes the first cell. The operations of 1405 may be performed in accordance with examples as disclosed herein. In some examples, aspects of the operations of 1405 may be performed by a PWS segment receiving manager 725 as described with reference to FIG. 7.

At 1410, the method may include performing a cell change procedure from the first cell to a second cell different from the first cell. The operations of 1410 may be performed in accordance with examples as disclosed herein. In some examples, aspects of the operations of 1410 may be performed by a cell change procedure manager 730 as described with reference to FIG. 7.

At 1415, the method may include receiving a second segment of the PWS information via the second cell. The operations of 1415 may be performed in accordance with examples as disclosed herein. In some examples, aspects of the operations of 1415 may be performed by a PWS segment receiving manager 725 as described with reference to FIG. 7.

At 1420, the method may include storing the first segment and the second segment within multiple message buffers based on the second cell being included within the geographical scope associated with the PWS information. The operations of 1420 may be performed in accordance with examples as disclosed herein. In some examples, aspects of the operations of 1420 may be performed by a message buffer manager 735 as described with reference to FIG. 7.

Figure 15:
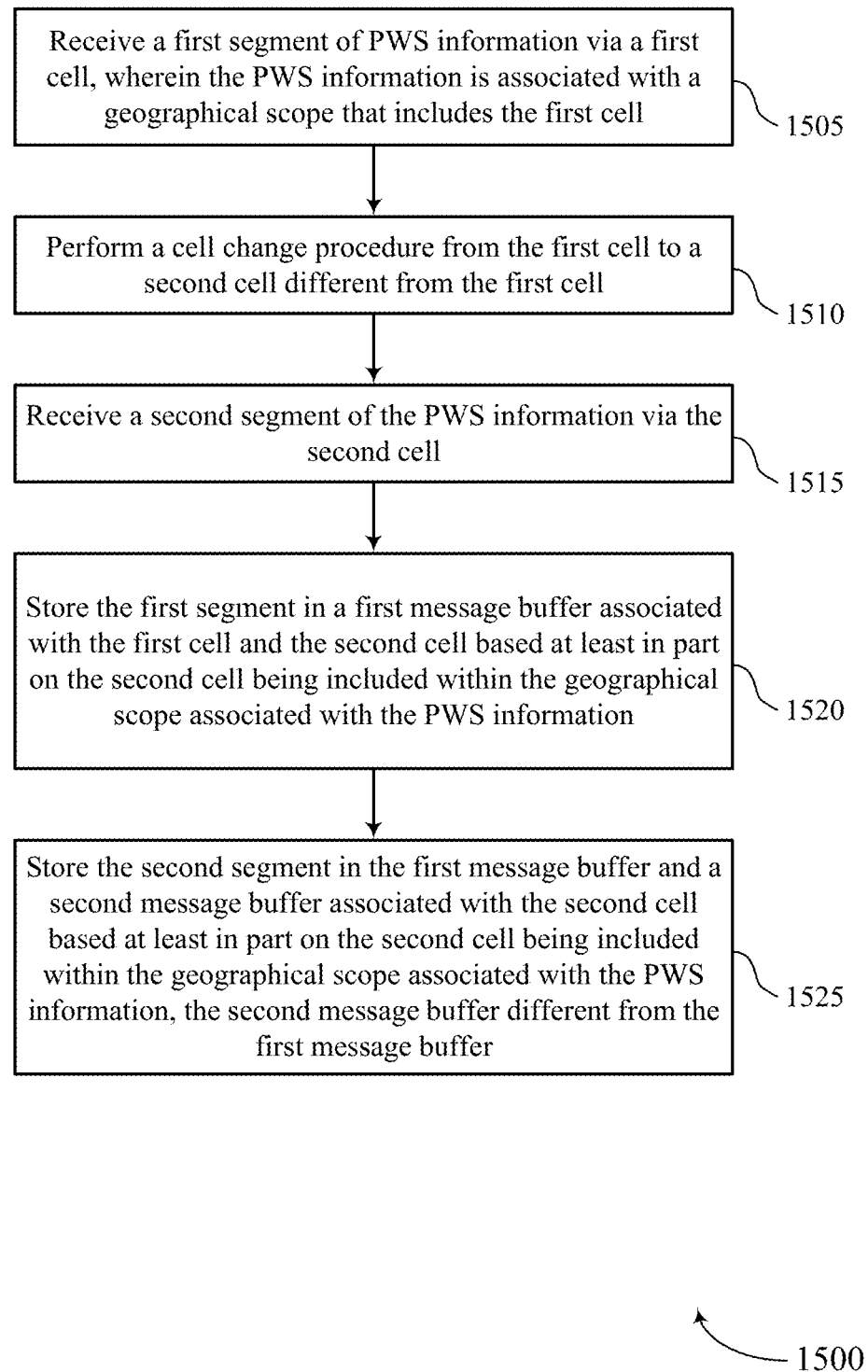

FIG. 15 shows a flowchart illustrating a method 1500 that supports techniques for handling PWS information using multiple message buffers in accordance with aspects of the present disclosure. The operations of the method 1500 may be implemented by a UE or its components as described herein. For example, the operations of the method 1500 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1505, the method may include receiving a first segment of PWS information via a first cell, where the PWS information is associated with a geographical scope that includes the first cell. The operations of 1505 may be performed in accordance with examples as disclosed herein. In some examples, aspects of the operations of 1505 may be performed by a PWS segment receiving manager 725 as described with reference to FIG. 7.

At 1510, the method may include performing a cell change procedure from the first cell to a second cell different from the first cell. The operations of 1510 may be performed in accordance with examples as disclosed herein. In some examples, aspects of the operations of 1510 may be performed by a cell change procedure manager 730 as described with reference to FIG. 7.

At 1515, the method may include receiving a second segment of the PWS information via the second cell. The operations of 1515 may be performed in accordance with examples as disclosed herein. In some examples, aspects of the operations of 1515 may be performed by a PWS segment receiving manager 725 as described with reference to FIG. 7.

At 1520, the method may include storing the first segment in a first message buffer associated with the first cell and the second cell based on the second cell being included within the geographical scope associated with the PWS information. The operations of 1520 may be performed in accordance with examples as disclosed herein. In some examples, aspects of the operations of 1520 may be performed by a message buffer manager 735 as described with reference to FIG. 7.

At 1525, the method may include storing the second segment in the first message buffer a second message buffer associated with the second cell based on the second cell being included within the geographical scope associated with the PWS information, the second message buffer different from the first message buffer. The operations of 1525 may be performed in accordance with examples as disclosed herein. In some examples, aspects of the operations of 1525 may be performed by a message buffer manager 735 as described with reference to FIG. 7.

Figure 16:
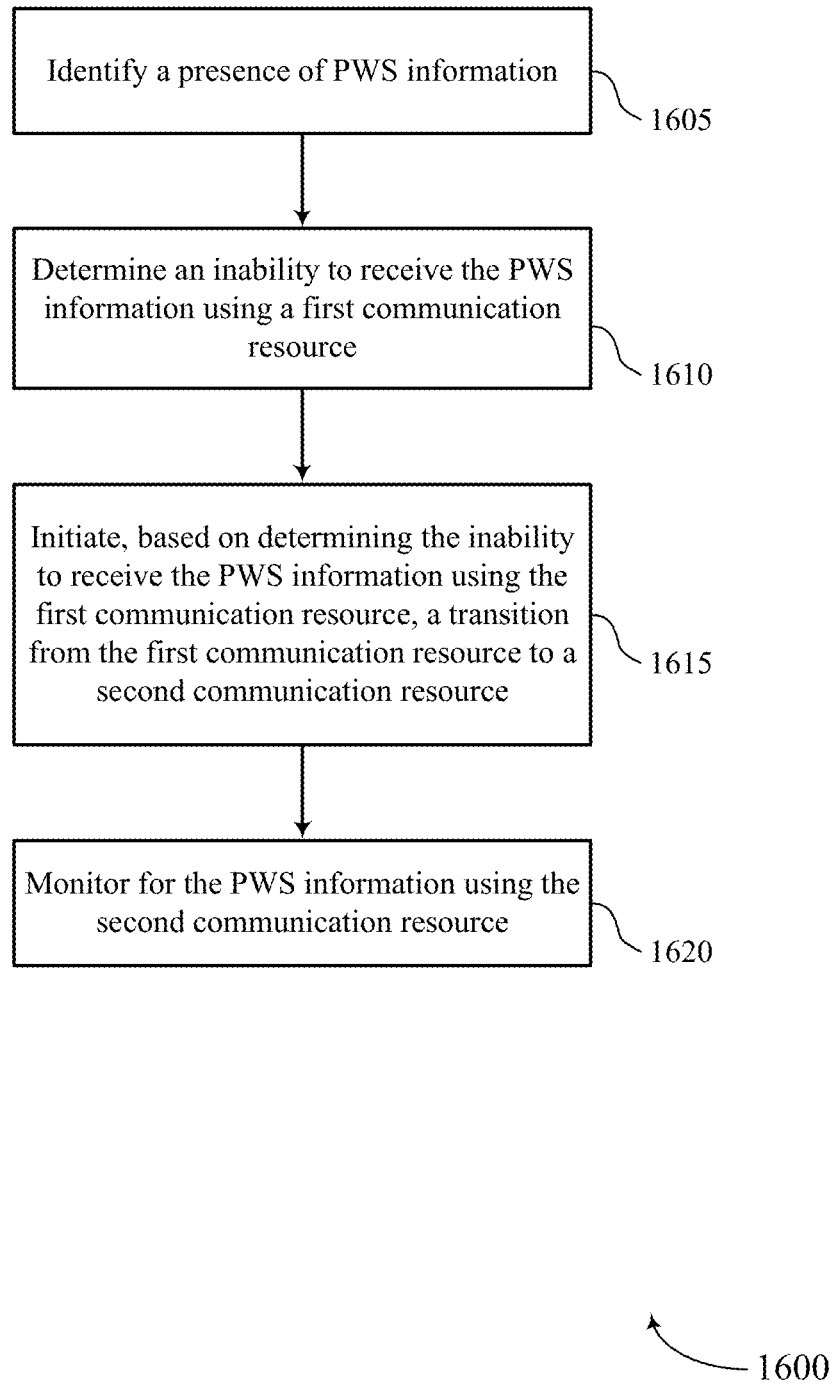
FIGS. 16 through 19 show flowcharts illustrating methods that support error handling for PWS information in accordance with aspects of the present disclosure.

FIG. 16 shows a flowchart illustrating a method 1600 for error handling for PWS information in accordance with aspects of the present disclosure. The operations of method 1600 may be implemented by a UE or its components as described herein. For example, the operations of method 1600 may be performed by a UE 115 as described with reference to FIGS. 1 through 15. In some examples, a UE may execute a set of instructions to control the functional elements of the device to perform the described functions. Additionally or alternatively, the UE may perform aspects of the described functions using special-purpose hardware.

At 1605, the method may include identifying a presence of PWS information. The operations of 1605 may be performed according to the methods described herein. In some examples, aspects of the operations of 1605 may be performed by a PWS monitoring component 1210 as described with reference to FIG. 12.

At 1610, the method may include determining an inability to receive the PWS information using a first communication resource. The operations of 1610 may be performed according to the methods described herein. In some examples, aspects of the operations of 1610 may be performed by a reception evaluation component 1215 as described with reference to FIG. 12.

At 1615, the method may include initiating, based at least in part on determining the inability to receive the PWS information using the first communication resource, a transition from the first communication resource to a second communication resource. The operations of 1615 may be performed according to the methods described herein. In some examples, aspects of the operations of 1615 may be performed by a communication resource selection component 1220 as described with reference to FIG. 12.

At 1620, the method may include monitoring for the PWS information using the second communication resource. The operations of 1620 may be performed according to the methods described herein. In some examples, aspects of the operations of 1620 may be performed by a PWS monitoring component 1210 as described with reference to FIG. 12.

Figure 17:
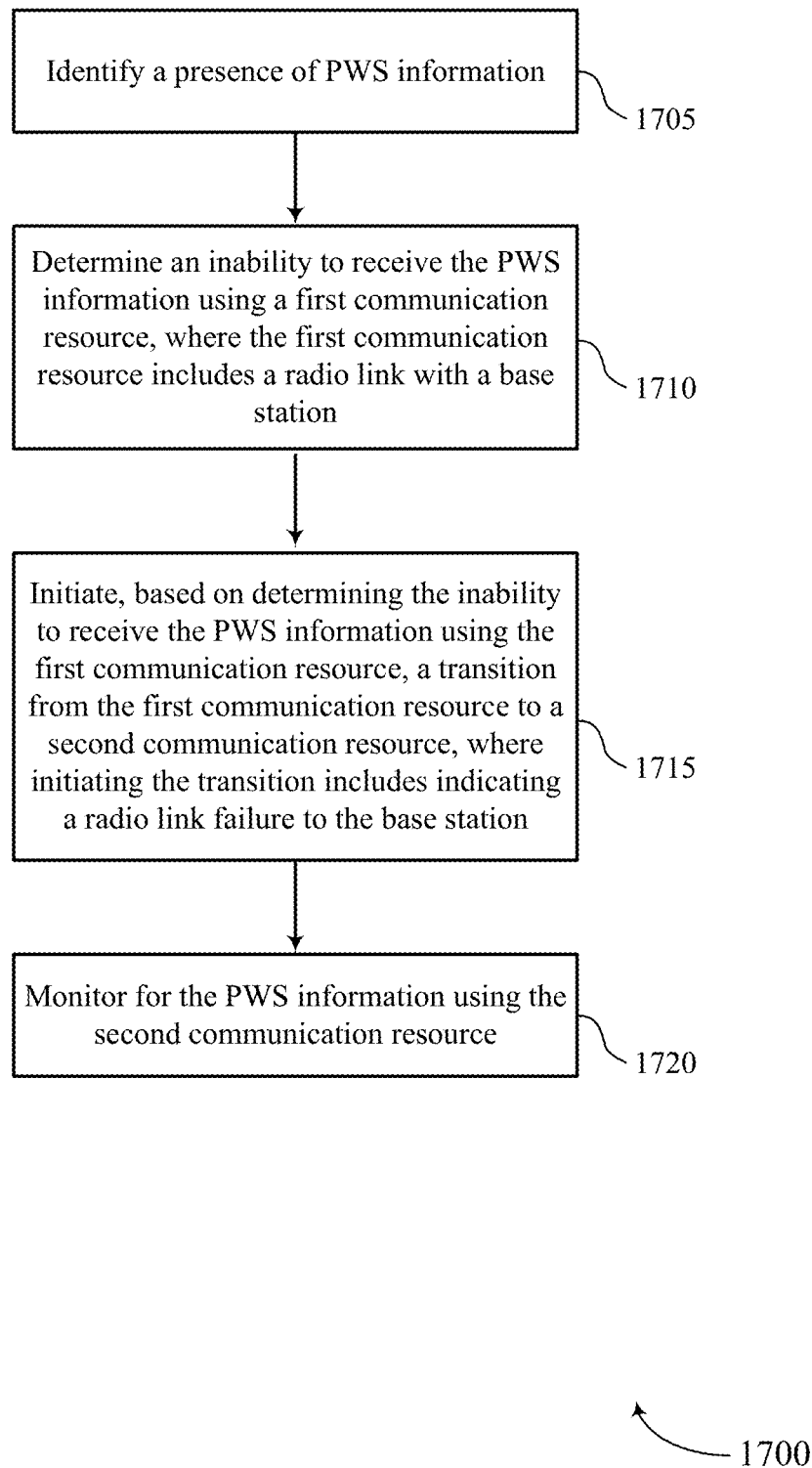

FIG. 17 shows a flowchart illustrating a method 1700 for error handling for PWS information in accordance with aspects of the present disclosure. The operations of method 1700 may be implemented by a UE or its components as described herein. For example, the operations of method 1700 may be performed by a UE 115 as described with reference to FIGS. 1 through 16. In some examples, a UE may execute a set of instructions to control the functional elements of the device to perform the described functions. Additionally or alternatively, the UE may perform aspects of the described functions using special-purpose hardware.

At 1705, the method may include identifying a presence of PWS information. The operations of 1705 may be performed according to the methods described herein. In some examples, aspects of the operations of 1705 may be performed by a PWS monitoring component 1210 as described with reference to FIG. 12.

At 1710, the method may include determining an inability to receive the PWS information using a first communication resource, where the first communication resource includes a radio link with a base station. The operations of 1710 may be performed according to the methods described herein. In some examples, aspects of the operations of 1710 may be performed by a reception evaluation component 1215 as described with reference to FIG. 12.

At 1715, the method may include initiating, based at least in part on determining the inability to receive the PWS information using the first communication resource, a transition from the first communication resource to a second communication resource, where initiating the transition includes indicating a RLF to the base station. The operations of 1715 may be performed according to the methods described herein. In some examples, aspects of the operations of 1715 may be performed by a communication resource selection component 1220 or an RLF indication component 1225 as described with reference to FIG. 12.

At 1720, the method may include monitoring for the PWS information using the second communication resource. The operations of 1720 may be performed according to the methods described herein. In some examples, aspects of the operations of 1720 may be performed by a PWS monitoring component 1210 as described with reference to FIG. 12.

Figure 18:
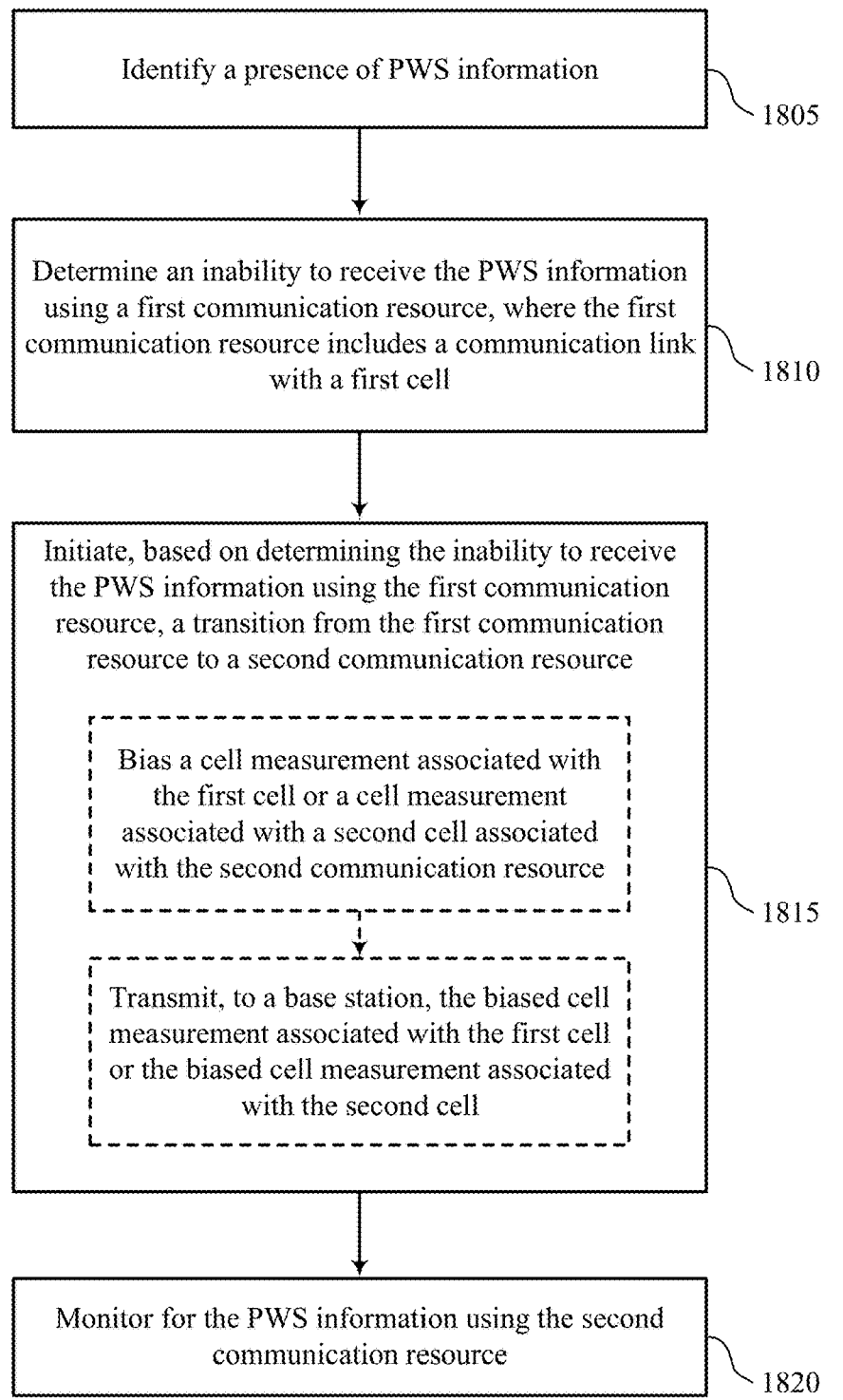

FIG. 18 shows a flowchart illustrating a method 1800 for error handling for PWS information in accordance with aspects of the present disclosure. The operations of method 1800 may be implemented by a UE or its components as described herein. For example, the operations of method 1800 may be performed by a UE 115 as described with reference to FIGS. 1 through 13. In some examples, a UE may execute a set of instructions to control the functional elements of the device to perform the described functions. Additionally or alternatively, the UE may perform aspects of the described functions using special-purpose hardware.

At 1805, the method may include identifying a presence of PWS information. The operations of 1805 may be performed according to the methods described herein. In some examples, aspects of the operations of 1805 may be performed by a PWS monitoring component 1210 as described with reference to FIG. 12.

At 1810, the method may include determining an inability to receive the PWS information using a first communication resource, where the first communication resource includes a communication link with a first cell. The operations of 1810 may be performed according to the methods described herein. In some examples, aspects of the operations of 1810 may be performed by a reception evaluation component 1215 as described with reference to FIG. 12.

At 1815, the method may include initiating, based at least in part on determining the inability to receive the PWS information using the first communication resource, a transition from the first communication resource to a second communication resource. To initiate the transition, the method may include biasing a cell measurement associated with the first cell or a cell measurement associated with a second cell associated with the second communication resource, and transmitting, to a base station, the biased cell measurement associated with the first cell or the biased cell measurement associated with the second cell. The operations of 1815 may be performed according to the methods described herein. In some examples, aspects of the operations of 1815 may be performed by a communication resource selection component 1220 as described with reference to FIG. 12.

At 1820, the method may include monitoring for the PWS information using the second communication resource. The operations of 1820 may be performed according to the methods described herein. In some examples, aspects of the operations of 1820 may be performed by a PWS monitoring component 1210 as described with reference to FIG. 12.

Figure 19:
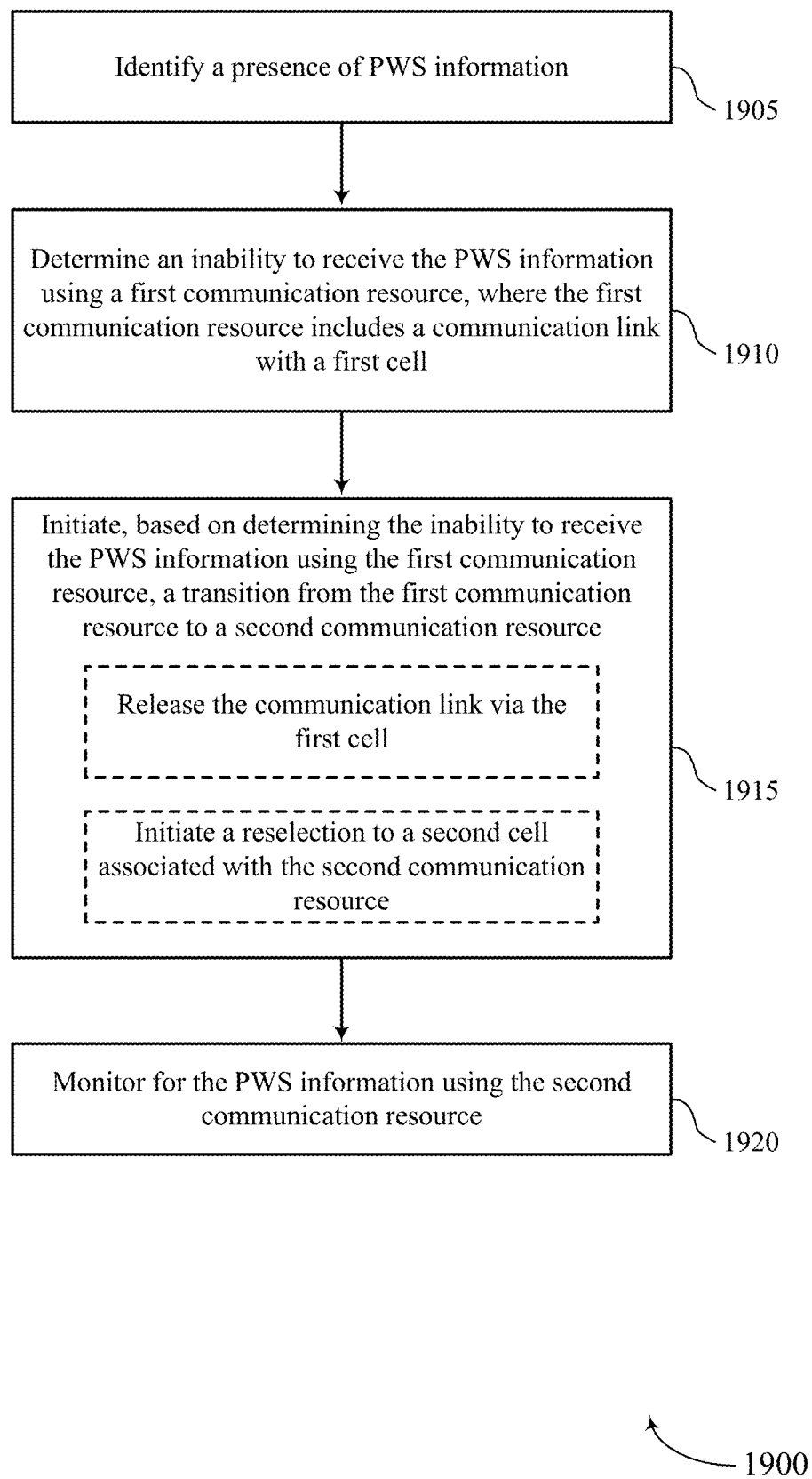

FIG. 19 shows a flowchart illustrating a method 1900 for error handling for PWS information in accordance with aspects of the present disclosure. The operations of method 1900 may be implemented by a UE or its components as described herein. For example, the operations of method 1900 may be performed by a UE 115 as described with reference to FIGS. 1 through 13. In some examples, a UE may execute a set of instructions to control the functional elements of the device to perform the described functions. Additionally or alternatively, the UE may perform aspects of the described functions using special-purpose hardware.

At 1905, the method may include identifying a presence of PWS information. The operations of 1905 may be performed according to the methods described herein. In some examples, aspects of the operations of 1905 may be performed by a PWS monitoring component 1210 as described with reference to FIG. 12.

At 1910, the method may include determining an inability to receive the PWS information using a first communication resource, where the first communication resource includes a communication link with a first cell. The operations of 1910 may be performed according to the methods described herein. In some examples, aspects of the operations of 1910 may be performed by a reception evaluation component 1215 as described with reference to FIG. 12.

At 1915, the method may include initiating, based at least in part on determining the inability to receive the PWS information using the first communication resource, a transition from the first communication resource to a second communication resource. In some examples, initiating the transition may include releasing the communication link via the first cell. Additionally or alternatively, in some examples, initiating the transition may include initiating a reselection to a second cell associated with the second communication resource. The operations of 1915 may be performed according to the methods described herein. In some examples, aspects of the operations of 1915 may be performed by a communication resource selection component 1220 as described with reference to FIG. 12.

At 1920, the method may include monitoring for the PWS information using the second communication resource. The operations of 1920 may be performed according to the methods described herein. In some examples, aspects of the operations of 1920 may be performed by a PWS monitoring component 1210 as described with reference to FIG. 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, the method comprising: receiving a first segment of PWS information via a first cell, wherein the PWS information is associated with a geographical scope that includes the first cell; performing a cell change procedure from the first cell to a second cell different from the first cell; receiving a second segment of the PWS information via the second cell; and storing the first segment and the second segment within multiple message buffers based at least in part on the second cell being included within the geographical scope associated with the PWS information.

Aspect 2: The method of aspect 1, wherein storing the first segment and the second segment comprises: storing the first segment in a first message buffer associated with the first cell and the second cell based at least in part on the second cell being included within the geographical scope associated with the PWS information; and storing the second segment in the first message buffer and a second message buffer associated with the second cell based at least in part on the second cell being included within the geographical scope associated with the PWS information, the second message buffer different from the first message buffer.

Aspect 3: The method of aspect 2, further comprising: receiving a third segment of the PWS information via the second cell; and storing the third segment in the first message buffer and the second message buffer.

Aspect 4: The method of any of aspects 2 through 3, further comprising: receiving a serial identifier associated with the second segment; and identifying that the second cell is included within the geographical scope associated with the PWS information is based at least in part on the serial identifier associated with the second segment.

Aspect 5: The method of any of aspects 2 through 4, further comprising: storing the first segment in the first message buffer, storing the second segment in the second message buffer, or both, based at least in part on a first serial identifier associated with the first segment matching a second serial identifier associated with the second segment and a first message identifier associated with the first segment matching a second message identifier associated with the second segment.

Aspect 6: The method of any of aspects 2 through 5, further comprising: discarding the first message buffer based at least in part on a first segmentation configuration associated with at least one segment stored in the first message buffer being different from a second segmentation configuration associated with at least one additional segment stored in the second message buffer.

Aspect 7: The method of any of aspects 2 through 6, further comprising: discarding the first message buffer based at least in part on the first segment and the second segment corresponding to a same PWS segment of the PWS information and a first length of the first segment being different from a second length of the second segment.

Aspect 8: The method of any of aspects 2 through 7, further comprising: discarding the first message buffer based at least in part on a sequentially last segment stored in the first message buffer being different from a sequentially last segment stored in the second message buffer.

Aspect 9: The method of any of aspects 2 through 8, further comprising: discarding the first message buffer based at least in part on a first concatenation configuration associated with the first message buffer being different from a second concatenation configuration associated with the second message buffer.

Aspect 10: The method of any of aspects 2 through 9, further comprising: discarding the first message buffer based at least in part on a first message identifier or a first serial identifier associated with the first segment being different from a second message identifier or a second serial identifier, respectively, associated at least one segment stored in the second message buffer.

Aspect 11: The method of any of aspects 2 through 10, further comprising: discarding the first message buffer based at least in part on an expiration of a timer associated with the first segment, the PWS information, or both.

Aspect 12: The method of any of aspects 2 through 11, further comprising: decoding the PWS information based at least in part on the first message buffer being completed, the second message buffer being completed, or both.

Aspect 13: The method of any of aspects 2 through 12, further comprising: performing, sequentially, one or more additional cell change procedures to additional target cells, with a first additional cell change procedure being from the second cell to a first additional target cell, the additional target cells included within the geographical scope associated with the PWS information; receiving, in connection with each additional cell change procedure and via respective additional target cells, respective additional segments of the PWS information; storing each of the respective additional segments in respective first additional message buffers that are each associated with one of the additional target cells corresponding to the respective additional segments; and storing each of the respective additional segments in second additional message buffers that are each associated with the one of the additional target cells and that are each also associated with the first cell, the second cell, and respective sets of the additional target cells to which the UE was changed over prior to being changed over to the one of the additional target cells.

Aspect 14: The method of aspect 13, further comprising: storing each of the respective additional segments in third additional message buffers that are each associated with a different set of two or more target cells to which the UE was changed over prior to being changed over to the one of the additional target cells; and discarding one or more message buffers based at least in part on a quantity of message buffers at the UE satisfying a depth threshold.

Aspect 15: The method of aspect 14, wherein discarding one or more message buffers comprises discarding an oldest message buffer at the UE, a second-oldest message buffer at the UE, or both.

Aspect 16: The method of any of aspects 2 through 15, further comprising: performing, sequentially, one or more additional cell change procedures to additional target cells, with a first additional cell change procedure being from the second cell to a first additional target cell, the additional target cells included within the geographical scope associated with the PWS information; receiving, in connection with each additional cell change procedure and via respective additional target cells, respective additional segments of the PWS information; storing each of the respective additional segments in respective first additional message buffers that are each associated with one of the additional target cells corresponding to the respective additional segments; storing each of the respective additional segments in second additional message buffers that are each associated with the one of the additional target cells and that are each also associated with a sequentially preceding target cell to which the UE was changed over to prior to being changed over to the one of the additional target cells.

Aspect 17: The method of any of aspects 2 through 16, further comprising: discarding a sequentially preceding second additional message buffer associated with target cells to which the UE was handed over prior to being changed over to the one of the additional target cells.

Aspect 18: The method of any of aspects 1 through 17, further comprising: receiving, via the second cell and based at least in part on performing the cell change procedure, a system information block comprising PWS scheduling information associated with the second cell, wherein the second segment of the PWS information is received in accordance with the PWS scheduling information.

Aspect 19: The method of any of aspects 1 through 18, wherein the geographical scope comprises a set of one or more cells, a public land mobile network, a tracking area, or any combination thereof.

Aspect 20: The method of any of aspects 1 through 19, further comprising: biasing a cell measurement associated with the first cell or a cell measurement associated with the second cell; and transmitting, to a base station, the biased cell measurement associated with the first cell or the biased cell measurement associated with the second cell, wherein performing the cell change procedure is based at least in part on transmitting the biased cell measurement associated with the first cell or the biased cell measurement associated with the second cell.

Aspect 21: The method of aspect 20, wherein the PWS information is associated with the geographical scope that includes the first cell and the second cell, the UE biases the cell measurement associated with the first cell or the cell measurement associated with the second cell based at least in part on the second cell being associated with the geographical scope of the PWS information.

Aspect 22: The method of any of aspects 1 through 21, wherein the PWS information is associated with the geographical scope that includes the first cell and the second cell, wherein performing the cell change procedure comprises: initiating a reselection to the second cell based at least in part on the second cell being associated with the geographical scope of the PWS information.

Aspect 23: The method of any of aspects 1 through 22, further comprising: receiving a paging signal comprising an indication of the presence of the PWS information, wherein receiving the first segment is based at least in part on receiving the paging signal.

Aspect 24: The method of any of aspects 1 through 23, further comprising: receiving a system information block comprising an indication of the presence of the PWS information, wherein receiving the first segment is based at least in part on receiving the system information block.

Aspect 25: An apparatus for wireless communication at a UE, comprising a processor; memory coupled with the processor; and instructions stored in the memory and executable by the processor to cause the apparatus to perform a method of any of aspects 1 through 24.

Aspect 26: An apparatus for wireless communication at a UE, comprising at least one means for performing a method of any of aspects 1 through 24.

Aspect 27: A non-transitory computer-readable medium storing code for wireless communication at a UE, the code comprising instructions executable by a processor to perform a method of any of aspects 1 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Components within a wireless communication system may be coupled (for example, operatively, communicatively, functionally, electronically, and/or electrically) to each other.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), the method comprising:
    receiving a first segment of public warning system (PWS) information via a first cell associated with a network entity, wherein the PWS information is associated with a geographical scope that includes the first cell;
    performing a cell change procedure from the first cell to a second cell different from the first cell, the second cell associated with the network entity, an additional network entity, or both, wherein the cell change procedure comprises a cell handover procedure, a cell selection procedure, a cell reselection procedure, or any combination thereof;
    receiving a second segment of the PWS information via the second cell;
    storing the first segment and the second segment within multiple message buffers at the UE based at least in part on the second cell being included within the geographical scope associated with the PWS information, and discarding the first segment based at least in part on the second cell not being included within the geographical scope associated with the PWS information; and
    decoding the PWS information based at least in part on storing the first and second segment within the multiple message buffers, or based at least in part on discarding the first segment.

2. The method of claim 1, wherein storing the first segment and the second segment comprises:
    storing the first segment in a first message buffer associated with the first cell and the second cell based at least in part on the second cell being included within the geographical scope associated with the PWS information; and
    storing the second segment in the first message buffer and a second message buffer associated with the second cell based at least in part on the second cell being included within the geographical scope associated with the PWS information, the second message buffer different from the first message buffer.

3. The method of claim 2, further comprising:
    receiving a third segment of the PWS information via the second cell; and
    storing the third segment in the first message buffer and the second message buffer.

4. The method of claim 2, further comprising:
    receiving a serial identifier associated with the second segment; and
    identifying that the second cell is included within the geographical scope associated with the PWS information is based at least in part on the serial identifier associated with the second segment.

5. The method of claim 2, further comprising:
    storing the first segment in the first message buffer, storing the second segment in the second message buffer, or both, based at least in part on a first serial identifier associated with the first segment matching a second serial identifier associated with the second segment and a first message identifier associated with the first segment matching a second message identifier associated with the second segment.

6. The method of claim 2, further comprising:
    discarding the first message buffer based at least in part on a first segmentation configuration associated with at least one segment stored in the first message buffer being different from a second segmentation configuration associated with at least one additional segment stored in the second message buffer.

7. The method of claim 2, further comprising:
    discarding the first message buffer based at least in part on the first segment and the second segment corresponding to a same PWS segment of the PWS information and a first length of the first segment being different from a second length of the second segment.

8. The method of claim 2, further comprising:
    discarding the first message buffer based at least in part on a sequentially last segment stored in the first message buffer being different from a sequentially last segment stored in the second message buffer.

9. The method of claim 2, further comprising:
    discarding the first message buffer based at least in part on a first concatenation configuration associated with the first message buffer being different from a second concatenation configuration associated with the second message buffer.

10. The method of claim 2, further comprising:
    discarding the first message buffer based at least in part on a first message identifier or a first serial identifier associated with the first segment being different from a second message identifier or a second serial identifier, respectively, associated at least one segment stored in the second message buffer.

11. The method of claim 2, further comprising:
discarding the first message buffer based at least in part on an expiration of a timer associated with the first segment, the PWS information, or both.

12. The method of claim 2, further comprising:
decoding the PWS information based at least in part on the first message buffer being completed, the second message buffer being completed, or both.

13. The method of claim 2, further comprising:
performing, sequentially, one or more additional cell change procedures to additional target cells, with a first additional cell change procedure being from the second cell to a first additional target cell, the additional target cells included within the geographical scope associated with the PWS information;
receiving, in connection with each additional cell change procedure and via respective additional target cells, respective additional segments of the PWS information;
storing each of the respective additional segments in respective first additional message buffers that are each associated with one of the additional target cells corresponding to the respective additional segments; and
storing each of the respective additional segments in second additional message buffers that are each associated with the one of the additional target cells and that are each also associated with the first cell, the second cell, and respective sets of the additional target cells to which the UE was changed over prior to being changed over to the one of the additional target cells.

14. The method of claim 13, further comprising:
storing each of the respective additional segments in third additional message buffers that are each associated with a different set of two or more target cells to which the UE was changed over prior to being changed over to the one of the additional target cells; and
discarding one or more message buffers based at least in part on a quantity of message buffers at the UE satisfying a depth threshold.

15. The method of claim 14, wherein discarding one or more message buffers comprises discarding an oldest message buffer at the UE, a second-oldest message buffer at the UE, or both.

16. The method of claim 2, further comprising:
performing, sequentially, one or more additional cell change procedures to additional target cells, with a first additional cell change procedure being from the second cell to a first additional target cell, the additional target cells included within the geographical scope associated with the PWS information;
receiving, in connection with each additional cell change procedure and via respective additional target cells, respective additional segments of the PWS information;
storing each of the respective additional segments in respective first additional message buffers that are each associated with one of the additional target cells corresponding to the respective additional segments;
storing each of the respective additional segments in second additional message buffers that are each associated with the one of the additional target cells and that are each also associated with a sequentially preceding target cell to which the UE was changed over to prior to being changed over to the one of the additional target cells.

17. The method of claim 2, further comprising:
discarding a sequentially preceding second additional message buffer associated with target cells to which the UE was handed over prior to being changed over to the one of the additional target cells.

18. The method of claim 1, further comprising:
receiving, via the second cell and based at least in part on performing the cell change procedure, a system information block comprising PWS scheduling information associated with the second cell, wherein the second segment of the PWS information is received in accordance with the PWS scheduling information.

19. The method of claim 1, wherein the geographical scope comprises a set of one or more cells, a public land mobile network, a tracking area, or any combination thereof.

20. The method of claim 1, further comprising:
biasing a cell measurement associated with the first cell or a cell measurement associated with the second cell; and
transmitting, to a base station, the biased cell measurement associated with the first cell or the biased cell measurement associated with the second cell, wherein performing the cell change procedure is based at least in part on transmitting the biased cell measurement associated with the first cell or the biased cell measurement associated with the second cell.

21. The method of claim 20, wherein
the PWS information is associated with the geographical scope that includes the first cell and the second cell,
the UE biases the cell measurement associated with the first cell or the cell measurement associated with the second cell based at least in part on the second cell being associated with the geographical scope of the PWS information.

22. The method of claim 1, wherein the PWS information is associated with the geographical scope that includes the first cell and the second cell, wherein performing the cell change procedure comprises:
initiating a reselection to the second cell based at least in part on the second cell being associated with the geographical scope of the PWS information.

23. The method of claim 1, further comprising:
receiving a paging signal comprising an indication of the presence of the PWS information, wherein receiving the first segment is based at least in part on receiving the paging signal.

24. The method of claim 1, further comprising:
receiving a system information block comprising an indication of the presence of the PWS information, wherein receiving the first segment is based at least in part on receiving the system information block.

25. An apparatus for wireless communication at a user equipment (UE), comprising:
at least one processor;
memory coupled to the at least one processor; and
instructions stored in the memory and executable by the processor to cause the apparatus to:
receive a first segment of public warning system (PWS) information via a first cell, wherein the PWS information is associated with a geographical scope that includes the first cell;
perform a cell change procedure from the first cell to a second cell different from the first cell;
receive a second segment of the PWS information via the second cell; and store the first segment and the second segment within multiple message buffers based at least in part on the second cell being included within the geographical scope associated with the PWS information.

26. The apparatus of claim 25, wherein the instructions to store the first segment and the second segment are executable by the processor to cause the apparatus to:
store the first segment in a first message buffer associated with the first cell and the second cell based at least in part on the second cell being included within the geographical scope associated with the PWS information; and
store the second segment in the first message buffer and a second message buffer associated with the second cell based at least in part on the second cell being included within the geographical scope associated with the PWS information, the second message buffer different from the first message buffer.

27. The apparatus of claim 26, wherein the instructions are further executable by the processor to cause the apparatus to:
receive a third segment of the PWS information via the second cell; and
store the third segment in the first message buffer and the second message buffer.

28. The apparatus of claim 26, wherein the instructions are further executable by the processor to cause the apparatus to:
receive a serial identifier associated with the second segment; and
identify that the second cell is included within the geographical scope associated with the PWS information is based at least in part on the serial identifier associated with the second segment.

29. An apparatus for wireless communication at a user equipment (UE), comprising:
means for receiving a first segment of public warning system (PWS) information via a first cell, wherein the PWS information is associated with a geographical scope that includes the first cell;
means for performing a cell change procedure from the first cell to a second cell different from the first cell;
means for receiving a second segment of the PWS information via the second cell; and
means for storing the first segment and the second segment within multiple message buffers based at least in part on the second cell being included within the geographical scope associated with the PWS information.

30. A non-transitory computer-readable medium storing code for wireless communication at a user equipment (UE), the code comprising instructions executable by at least one processor to:
receive a first segment of public warning system (PWS) information via a first cell associated with a network entity, wherein the PWS information is associated with a geographical scope that includes the first cell;
perform a cell change procedure from the first cell to a second cell different from the first cell, the second cell associated with the network entity, an additional network entity, or both, wherein the cell change procedure comprises a cell handover procedure, a cell selection procedure, a cell reselection procedure, or any combination thereof;
receive a second segment of the PWS information via the second cell;
store the first segment and the second segment within multiple message buffers at the UE based at least in part on the second cell being included within the geographical scope associated with the PWS information, and discarding the first segment based at least in part on the second cell not being included within the geographical scope associated with the PWS information; and
decode the PWS information based at least in part on storing the first and second segment within the multiple message buffers, or based at least in part on discarding the first segment.

* * * * *